United States Patent [19]

Theeuwes et al.

[11] 3,916,899

[45] *Nov. 4, 1975

[54] OSMOTIC DISPENSING DEVICE WITH MAXIMUM AND MINIMUM SIZES FOR THE PASSAGEWAY

[75] Inventors: Felix Theeuwes, Los Altos, Calif.; Takeru Higuchi, Lawrence, Kans.

[73] Assignee: Alza Corporation, Palo Alto, Calif.

[*] Notice: The portion of the term of this patent subsequent to Nov. 5, 1974, has been disclaimed.

[22] Filed: Feb. 7, 1974

[21] Appl. No.: 440,281

Related U.S. Application Data

[63] Continuation-in-part of Ser. Nos. 354,325, April 25, 1973, abandoned, and Ser. No. 259,469, June 5, 1972, Pat. No. 3,845,770.

[52] U.S. Cl. .............................................. 128/260
[51] Int. Cl. ......................................... A61m 31/00
[58] Field of Search ........................... 128/127–130, 128/213, 260, 261, 269; 99/77.1; 424/15, 19–21, 37; 222/386.5, 389; 206/.5

[56] References Cited
UNITED STATES PATENTS 3,811,444  5/1974  Heller et al. ........................ 128/260

Primary Examiner—Richard A. Gaudet
Assistant Examiner—J. C. McGowan
Attorney, Agent, or Firm—Paul L. Sabatine; Edward L. Mandell; Thomas E. Ciotti

[57] ABSTRACT

A device is disclosed comprised of a wall surrounding and forming a compartment for containing a useful composition of matter and having a passageway for dispensing the compostion. The wall is comprised in at least a part of a material permeable to an external fluid. The composition is soluble in the fluid and exhibits an osmotic pressure gradient against the fluid or the composition has limited solubility and is admixed with an osmotically effective compound soluble in the fluid that exhibits an osmotic pressure gradient against the fluid. In operation composition is dispensed from the device by fluid permeating into the compartment producing a solution of the soluble composition or a solution of the osmotically effective compound containing the composition, which solution in either operation is released through the passageway to the exterior of the device at a rate controlled by the permeability of the wall and the osmotic pressure gradient across the wall of the device.

36 Claims, 14 Drawing Figures

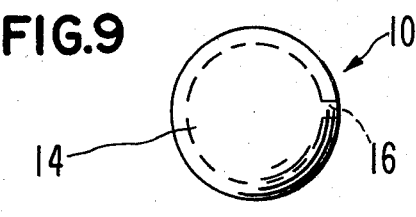
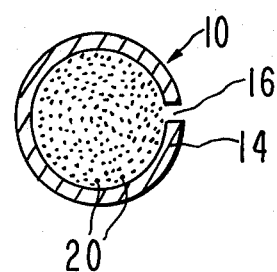
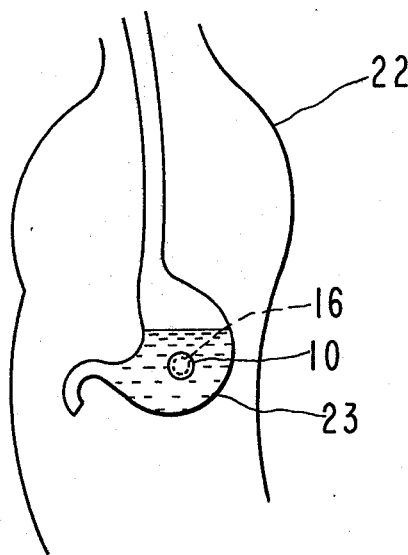
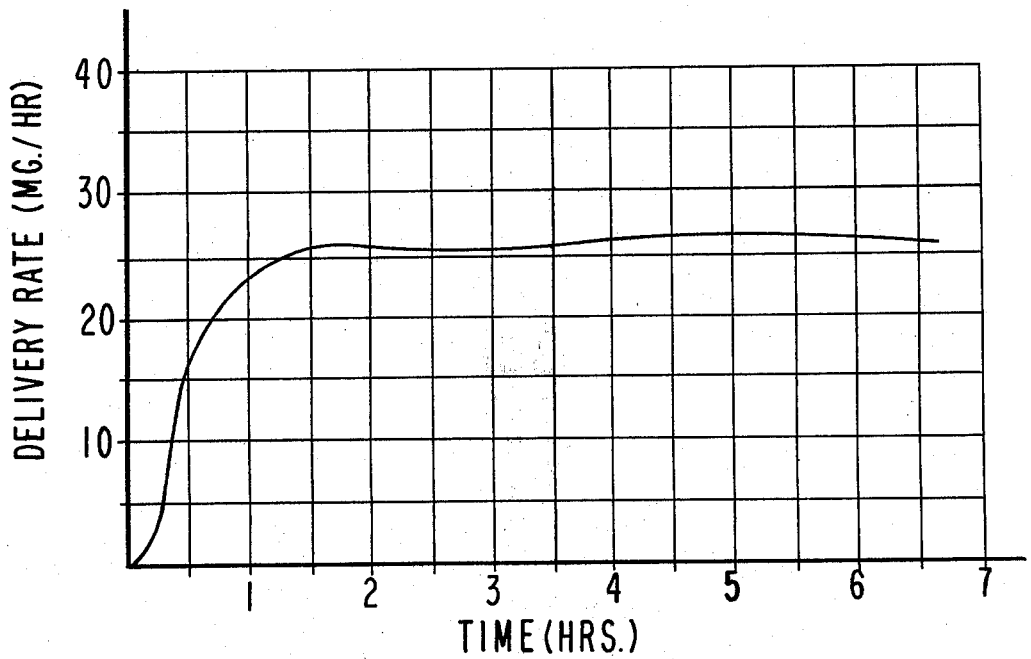

OSMOTIC DISPENSING DEVICE WITH MAXIMUM AND MINIMUM SIZES FOR THE PASSAGEWAY

CROSS REFERENCE TO RELATED APPLICATIONS

This application is a continuation-in-part of our co-pending U.S. Pat. application Ser. No. 354,325, filed on Apr. 25, 1973, now abandoned, and U.S. patent application Ser. No. 259,469, filed on June 5, 1972 now U.S Pat. No. 3,845,770. These applications are assigned to the same assignee of this application, and both of these applications are incorporated into this application by reference.

FIELD OF THE INVENTION

This invention pertains to both a novel and useful device for dispensing a useful composition of matter. More particularly, the invention relates to a dispensing device for the controlled and continuous dispensing of a composition over a prolonged period of time to produce a beneficial effect. Specifically, the invention concerns an osmotic dispenser manufactured with a minimum number of components and suitable for administering an active agent at a controlled and continuous rate to achieve a predetermined useful effect in animals, humans and other environments.

BACKGROUND OF THE INVENTION

Dispensing systems for the delivery of compositions of matter are well known to the prior art. These systems generally delivery their composition by diffusion, for example, from an enclosed capsule or by diffusion from a multi-structured device having a wall formed of a known polymer permeable to the composition into a selected environment. However, there is a large category of compositions that cannot be delivered by the prior art delivery systems because of at least one feature inherent in these devices which adversely affects their rate of release from the system or substantially prevents the release of the composition from the system. For example, many compositions cannot be delivered from a diffusion controlled delivery system because their permeation rate through the rate controlling material comprising the system is too small to produce a useful effect, or in many instances the composition molecules are too big and will not diffuse through the rate controlling material forming the device. Also, there is an additional class of useful products that cannot be satisfactorily delivered by diffusion devices because of a particular chemical characteristic of the product. This additional class includes salts that because of their ionic character will not diffuse through most polymers and polymeric like materials and unstable polar compounds that cannot be formulated into a satisfactory composition suitable for storage and delivery from a prior art device. Prior art diffusion systems encompassed within the above discussion are typically represented by U.S. Pat. No. 3,279,996, and the like.

The prior art attempted to overcome the above mentioned adverse features by proposing devices seemingly capable of releasing a solution containing a product at a relatively constant rate. One such device is disclosed in *Austral. J. Exp. Biol.*, *Vol.* 33, pages 415 to 420, 1955. This device consists of three compartments confined in a specially constructed housing and a clamp to hold a semi-permeable membrane. The driving force of the device depends on the continual presence of a solution of an osmotically effective red dye solute that exhibits an osmotic pressure gradient against water. The red dye is contained in a partially collapsed rubber compartment and it is separated from a second compartment containing water by a semi-permeable membrane. The partially collapsed bag is housed in a glass ampoule, along with a product compartment defined by the space between the bag and one end of the glass ampoule. The distant end of the ampoule defines a water compartment. The ampoule also is provided with a drug release nipple, and in operation when the product compartment is charged with a solution of a product, water in the water compartment moves through the semi-permeable membrane into the dye solution increasing its volume in the compartment causing it to expand against the rubber providing the mechanical force necessary to eject the product solution through the nipple. It is immediately evident that this device has certain adverse features that tend to diminish its practical use. For example, the device is difficult to construct into compartments that are essentially free of leaks plus the fabrication demands of a movable material that necessitates a rigid outer housing. Another inherent disadvantage which prevented its wide acceptance by the medical community is the requirement that the product be in solution which exhibit a deleterious tendency to be released from the device by simple leaching, the use of a solution of the product which use does not permit high concentrations of the product to be embodied within the device, the demand for an osmotically effective solute other than the product, and that many products on prolonged storage in solution undergo chemical deterioration. The device is further of limited value because it must carry its own water which increases the size of the device and thusly limits its use to a few environments. Another prior art attempt to provide a product dispensing device is disclosed in U.S. Pat. No. 3,604,417. The device disclosed in this patent is similar to the earlier prior art devices, and its design requires a semi-permeable membrane, a separate osmotically effective solute, a solution of the product and additionally the present of a movable piston. The movable piston severely restricts the shape of the device, and this device, as with the abovementioned device, has not enjoyed wide acceptance because of construction problems and the inherent features that limit the use of the device.

In prior art U.S. Pat. No. 3,146,169 there is disclosed a pharmaceutical tablet formulation comprised of a layer impermeable to both water and medication which surrounds the medication except for a hole. In this device medication is released by uncontrolled dissolution predicated upon many variables. For example, the rate of medication dissolution is pH dependent that varies according to the environment, and when it changes the solubility of the medication its rate of release is correspondingly changed. The rate of release is also stirring rate dependent and any external fluid must be in a constant state of flux to cause a dissolution of the product for its release from the tablet. Hence, if the motion of fluid external to the device is changed, the diffusional path length changes, and a turbulence can be created altering the release rate from the device. Further, in this tablet, the exposed surface area of the product continually changes at an uncontrolled rate to release product in changing amounts, which features seriously limit the usefulness of the tablet. Also, as the exposed surface area of medication and the length of the diffusional path change, the amount of medication released becomes unpredictable and, as such, this device cannot be relied upon for use in the management of health and disease.

One critical disadvantage with the above described and other conventional drug delivery systems is that the release rate of drug, or the rate of delivery of drug from these devices is proportional to the rate of dissolution of the drug, which is dependent on the pH of the environment for any given drug with a solubility which is pH dependent in the fluid of the environment. The rate of dissolution for drugs generally with pH dependent solubilities is known to the art in *The Theory and Practice of Industrial Pharmacy*, edited by Lachman, L., et al, pages 226 to 301, published by Lea and Febiger, Philadelphia, Pennsylvania. The uncontrolled influence of pH is seen in an environment of use such as in the gastrointestinal tract of mammals where the pH changes from about pH $\approx$ 1 in the stomach to pH $\approx$ 8 in the intestine. Additionally, there is pH variations within mammalian species.

It is well known to the prior art that the solubility of numerous pharmaceutically acceptable drugs is drastically different in these two different environments, and the delivery rate from the prior art devices will be totally different in these two environments. The pH dependent drugs can be divided into different categories. One represented by a class of drugs that have a low solubility at low pH, for example, as in the stomach, and soluble at high pH, as for example in the intestine. And another class of drugs comprising soluble drugs at low pH as in the stomach, and sparingly soluble at high pH as in the intestine. Representative of drugs insoluble at low pH include salicylic acid, allopurinol, phenobarbital, sulfathiazole, acetazolamide, and the like. These drugs are soluble at high pH in the following physical forms such as sodium salicylate, sodium phenobarital, sulfathiazole sodium, and sodium acetazolamide. Representative of drugs insoluble at high pH include chlordiazepoxide, oxytetracycline, cocaine, quinine, spartiene, and the like. These drugs are soluble at low pH in the following chemical forms, chlordiazepoxide hydrogen chloride, oxytetracycline hydrochloride, cocaine hydrochloride, quinine dihydrochloride, spartiene sulfate, and the like. The delivery rate from the conventional dosage forms of the drugs as described above, will change from a low rate in the stomach to a high rate in the intestine, and the delivery rate of the latter class will change from a high rate in the stomach to a low rate in the intestine.

The drug delivery device prepared according to the spirit of this invention is useful for administering various dosage forms having a release rate that is controlled by the structure of the device, mainly, the fluid permeability of the osmotic semi- permeable membrane, the membrane dimensions, and the osmotic pressure of the continually forming formulation solution in the osmotic compartment of the device. The semipermeable character of the membrane of the instant device is impermeable to ions and the pH inside the compartment is maintained independently of the pH of the environment. Because the pH inside the device is essentially constant, the solubility of any given drug inside the device is constant and the release rate is completely independent of the pH on the exterior of the device. Thus, the device of this invention makes available to the art an unexpected great advantage that drug inside the device's osmotic compartment can be formulated at any desired pH and delivered in solution therefrom.

Other prior art attempts to provide a controlled dosage release is described in U.S. Pat. No. 3,247,066. In this patent a device is described comprised of a polymeric wall that fully surrounds a drug colloid mixture. Drug is released from the device under the influence of water entering the mixture to cause an increased internal swelling pressure of the colloid that builds up sufficiently to exceed the strength of the polymer wall. The build-up is followed by a rupture of the wall that immediately releases drug in an undetermined amount. This action, plus any subsequent drug release, is by seemingly uncontrolled dissolution which features tend to inherently limit the acceptability of this device for the controlled and prolonged administration of drug. Similarly, in U.S. Pat. No. 3,538,214 there is disclosed a tablet comprised of a drug matrix coated with a microporous film permeable to fluid and drug as another prior art means for the controlled release of drug. The device of this patent releases drug by letting water pass through the pores to dissolve drug which is released through the pores. The rate of drug release is again influenced by environmental factors such as pH dependency and this coupled with both an unspecified number of pores of variable sizes arising through manufacture and material limitations limits the use of this device in the useful arts and sciences.

In copending patent applications U.S. Ser. No. 106,131, filed on Jan. 13, 1971, now U.S. Pat. No. 3,760,805, and U.S. Ser. No. 106,161, filed Jan. 13, 1971, now abandoned with both applications to the same assignee of the application, there is disclosed novel and useful osmotic dispenser devices that represent an improvement to the art. While these devices have made a valuable contribution to the art, they are designed with moving parts that tend to complicate their manufacture and they require, in addition to the product, the constant presence of an osmotically effective solute that exhibits an osmotic pressure gradient against water. This latter feature generally increases the size of the device and concomitantly restricts its use to fewer environments.

OBJECTS OF THE INVENTION

Accordingly, it is an immediate object of this invention to provide a novel dispensing device for the dispensing of a composition of matter to produce a beneficial effect, which device overcomes the aforesaid disadvantages associated with the prior art devices.

Another object of the invention is to provide a new and useful delivery device for the administration of an active agent wherein the device is nonrupturable and maintains its physical and chemical integrity throughout its agent-release history.

Yet another object of the invention is to provide a new and useful delivery device for the controlled and uniform release of an active agent wherein the agent is released from the device essentially free from environmental influence.

Still another object of the invention is to provide an agent delivery device for the prolonged essentially zero order release of agent wherein agent is release independent of pH.

Yet still a further object of the invention is to provide a novel and useful osmotic drug delivery device that releases active agent essentially free of any stirring rate dependency at a constant and controlled rate over a prolonged time.

Yet still a further object of the invention is to provide a novel and useful drug delivery device wherein the drug is essentially released by osmotic action and the device is adapted for animal, including humans, orifices, animal passageways or for implantation into animal, including mammals.

Still a further object of the invention is to provide an osmotic delivery device for osmotically dispensing an active agent into fields, rivers, streams and the like.

Still another object of the invention is to provide a novel dispensing device for dispensing a composition of matter at a controlled rate for a prolonged period of time.

Yet still another object of this invention is to provide a novel and useful dispensing device that is simple in construction, designed with a minimum number of parts, easy to use, and in operation exhibits all the practical and useful benefits obtained by the controlled, continuous, long-term administration of various compositions of matter, that is, active agents to animals, avians, humans and into other receptive environments.

Yet another object of the invention is to provide an oral tablet containing drug surrounded with a semipermeable membrane except for a passageway through which drug is osmotically released at a controlled rate continuously for a prolonged period of time.

A further object of this invention is to provide a novel dispensing device that can administer a complete pharmaceutical dosage regimen for a particular time period, the use of which requires intervention only for initiation and termination of the regimen.

Another object of this invention is to provide an improved dispensing device which will permit high concentration of an active agent to be contained therein, and which high concentrations of the agent will not exhibit the tendency to be leached from the device nor have its potency decreased by chemical breakdowns.

Yet still a further object of the invention is to provide a novel product dispensing device that contains a product which product can be used as an osmotically effective solute to exhibit an osmotic pressure gradient against an external fluid.

Yet a further object of the invention is to provide a product dispensing device that contains a product in a form suitable for storage thereby giving the device an improved shelf life.

Yet another immediate object of this invention is to provide a dispensing device for the administration of locally acting or systemically acting drugs to produce a physiologic or pharmacologic effect and which device can release the drug at a rate that does not vary with time.

Still yet another object of the invention is to provide a device containing drugs in various physicochemical forms that can be sterilized when needed by operable conventional techniques.

Yet another important object of the invention is to provide a device for dispensing an active agent which device can have a variety of release rates ranging from very low to very high by using polymeric wall forming materials in combination with the active agent or a mixture of an active agent and another osmotically effective compound.

Yet still another object of the invention is to provide a novel and useful erodible or biodegradable device that erodes or degrades after the device has released the active agent, or at the end of the drug release rate preprogrammed history.

Still a further object of the invention is to provide an osmotic device having an osmotic passageway that substantially maintains its physical integrity during the osmotic drug release period.

Other objects, features, and advantages of the invention will be apparent to those skilled in the art from the detailed description of this specification, taken in conjunction with the drawings and the accompanying claims.

SUMMARY OF THE INVENTION

The invention concerns a device comprised of a wall surrounding a compartment as a means for containing a useful composition of matter such as a drug, a beneficial product or the like, and having a passageway communicating with the compartment and the exterior of the device for releasing the composition, or the like, from the compartment. The wall of the device is comprised in at least a part of a material permeable to an external fluid common to the environment of use and essentially impermeable to the useful composition. Composition is dispensed from the device by the external fluid diffusing through the wall into the compartment to dissolve the composition or to dissolve an osmotically effective compound admixed with a composition having limited solubility in the fluid in the compartment, producing thereby an essentially saturated solution of the composition or an essentially saturated solution of the osmotic compound containing the latter composition, which solution in either instance is dispensed from the device by a constant influx of fluid from the environment and wherein the influx is generated by the continuous internal dissolution of the composition or the osmotically effective compound in the fluid diffusing at a controlled rate through the wall under the osmotic pressure gradient across the wall into the compartment. The device can in operation dispense a composition at a zero order rate of release for a prolonged period of time by maintaining the rate of internal dissolution of the composition, or the osmotic compound in the fluid constant. In the device the latter is accomplished when the dissolution rate is larger than the rate of release of the composition or the osmotic compound in the fluid present in the passageway to the exterior of the device. In operation, composition is released through the passageway to the exterior of the device at a rate controlled by the permeability of the wall and the osmotic pressure gradient across the wall of the device.

BRIEF DESCRIPTION OF THE DRAWINGS

In the drawings, which are not drawn to scale, but rather set forth to illustrate various embodiments of the invention, there appears as follows:

FIG. 9 illustrates an oral osmotic drug delivery tablet for osmotically administering a physiologically or pharmacologically-effective amount in the gastro-intestinal tract of animals including veterinary animals and humans.

FIG. 10 is a cross-sectional of the device of FIG. 9 with the top portioned section to lay open the interior structure of the osmotic oral dosage form of FIG. 9.

FIG. 11 is a view diagrammatically illustrating an osmotic drug delivery device manufactured according to the invention in an environment of use, such as the stomach.

FIG. 12 is a graph showing a controlled and constant rate of release for the device over a prolonged period of time.

In the drawings and specification, like parts in related figures are identified by like numbers. The terms appearing earlier in the specification and in the description of the drawings, as well as embodiments thereof, are further described elsewhere in the disclosure.

DETAILED DESCRIPTION OF THE DRAWINGS

Figure 1:
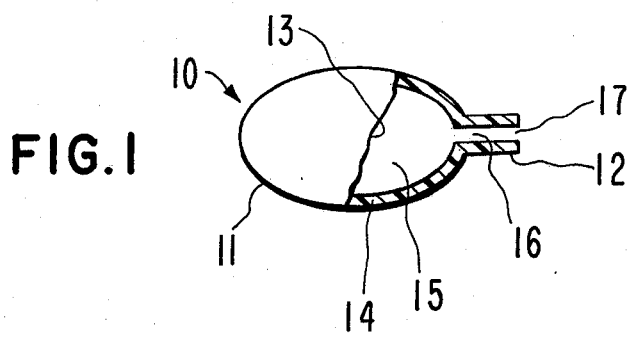
FIG. 1 is an illustration of a delivery device of the invention with a portion of the wall removed to illustrate the general structure of the device.

Turning now to the drawings in detail, which are examples of various delivery devices of the invention, and which examples are not to be construed as limiting, one embodiment of a novel osmotic delivery device is indicated in FIG. 1 by the number 10. Delivery device 10 is comprised of a body portion 11 and a neck 12 suitably joined to body 11. Device 10 is shown in open section 13 with part of a wall removed and device 10 is comprised of a wall 14 surrounding a compartment 15. Compartment 15 is a means for containing a composition, that is, it is a product compartment, and it can contain a product, or a mixture of products such as a drug or other active agent, not shown in FIG. 1. Neck 12 of device 10 in this embodiment is extended from body 11 and it is formed with a passageway 16 that communicates with chamber 15 and the exterior of the device through opening 17 at the end of neck 12. Neck 12 can be optionally integrally formed with body 11, or it can be separately manufactured and then joined to body 11 by conventional techniques such as adhesively sealing, heat joining, laser sealing, and the like.

Wall 14 of delivery device 10 is comprised in total or in at least a part of a film forming semi-permeable membrane that possesses permeability to an external fluid while simultaneously being essentially impermeable to a product housed in compartment 15. That is, body 11 formed of wall 14 can be of unit construction, or composite construction with a section of a semi-permeable membrane either formed integral in wall 14, or optionally lined or laminated to wall 14. Wall 14 is formed of a semi-permeable material that has uniform properties across all its dimensions, that is, it is substantially imperforate or substantially homogeneous while remaining essentially impermeable to a product present in compartment 15. In operation, wall 14 is comprised of a material that is substantially imperforate, molecules of the external fluid dissolve in and diffuse through wall 14 by the process of osmotic diffusion into compartment 15. When wall 14 is formed in at least a part of a selectively permeable material or membrane permeable to the passage of an external fluid but impermeable to the passage of active agent, the remaining part of wall 14 is formed of a material that is substantially impermeable to the passage of external fluid and impermeable to the passage of active agent. Wall 14 is formed totally of synthetic or naturally occurring semi-permeable materials or it can be formed in part of synthetic or naturally occurring semi-permeable materials and in part of a synthetic or naturally occurring impermeable material. A detailed description of these materials appears later in this specification. The device of FIG. 1 can be adapted for releasing active agent in many environments such as, for releasing fertilizers in plowed fields, for releasing insecticides in streams, for releasing medications in farm animals including cattle, horses, sheep, pigs and the like, for releasing active agent in humans and other like uses.

Figure 2:
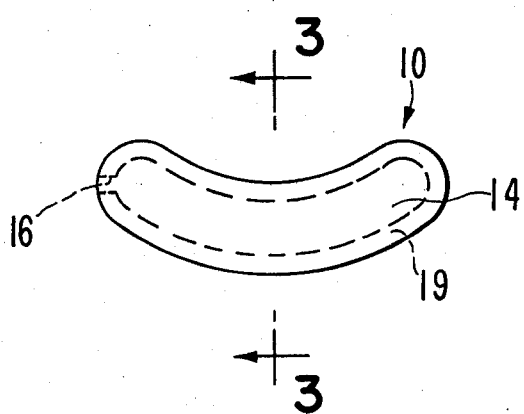
FIG. 2 is a perspective, top view of a dispensing device of the invention illustrating as one embodiment of the invention a device manufactured as an ocular drug delivery device.

In FIG. 2 there is seen another delivery device 10 manufactured according to the mode and manner of the invention. Product delivery device 10 in this embodiment is an ocular drug delivery device of bean shape and it is illustrated in FIG. 2 in top perspective view. Ocular drug delivery device 10 comprised of a wall 14 formed of a selectively permeable material that is permeable to an external fluid but substantially impermeable to active agent, drug and the like, not seen in FIG. 2 that is housed in device 10. Device 10's outer wall 14 carries on its inner surface an inner positioned wall 19 formed with a passageway 16, schematically illustrated by dashed lines, which wall 19 is extended around the perimeter of wall 14 to engage it in sealed relation with another wall, not shown in FIG. 2 and positioned distant from illustrated wall 14. The distant wall can be of the same construction as wall 14, that is, a semi-permeable material, or it can be formed of a material that is impermeable to an external fluid and impermeable to active agent and the like drug, to form a composite ocular drug delivery device. Wall 14 of device 10 can be made of a material that is in part semipermeable and in part impermeable and these materials can be of synthetic or naturally occurring origin.

Figure 3:
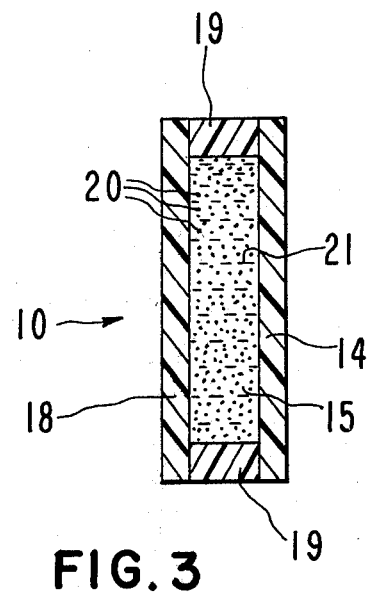
FIG. 3 is an enlarged cross-sectional view of the ocular drug delivery device of FIG. 2 through 3—3 depicting two walls with their interior peripheral surfaces in intimate contact with the surfaces of a wall positioned between the two walls.

Referring to FIG. 3, ocular drug delivery device 10 is seen in cross-section through 3—3 of FIG. 2. Ocular drug delivery device 10 of FIG. 3 is comprised of a first wall 14 and a third wall 18 distant from first wall 14. Wall 14 and wall 18 bear on their inner surface a second wall 19 that extends around the outer perimeter of wall 14 and wall 18 to form a closed drug compartment 15. Compartment 15 is comprised of a composition that is drug 20 or a mixture of drugs or the like. A passageway, not seen in FIG. 3, communicates with drug chamber 15 and the exterior of the device 10 for the release of drug 20. Wall 14 and wall 18 can be the same or they can be different and at least one of the walls, 14 or 18, or both of the walls, is comprised of a semi-permeable material selectively permeable to the passage of external fluid 21, for example, tear fluid in the eye as by diffusion, and substantially impermeable to active agent such as drug. While at least one of wall 14 or wall 18 is permeable to tear fluid 21, both of the walls are impermeable to the passage of drug 20. When wall 14 or wall 18 is formed of a semi-permeable membrane impermeable to drug, and the distant wall is formed of a different material, the latter material is substantially impermeable to both fluid and drug. In both structures the wall forming materials are substantially insoluble in body fluids and endowed with biological inertness.

Wall 19 of device 10 of FIG. 3 is formed of a nonallergenic, biologically inert, insoluble in tear fluid material suitable for joining wall 14 and wall 18 together to form an essentially closed compartment 15 as defined by the inner surfaces of walls 14, 18 and 19. Device 10 when made from a material that is insoluble in tear fluid is removed from the eye after it completes its drug release program and discarded, or, device 10 can be made from a semi-permeable bioerodible material that timely bioerodes in situ to harmless end products only after the device has completed its predetermined drug release program. The walls 14, 18 and 19 of device 10 of the invention are formed of a material that can be rigid, semi-rigid, semi-flexible, flexible or the like and for the user's comfort in contact with skin, in body cavities, or in the eye it is preferably a flexible material that retains its physicochemical integrity throughout the drug release history.

Figure 4:
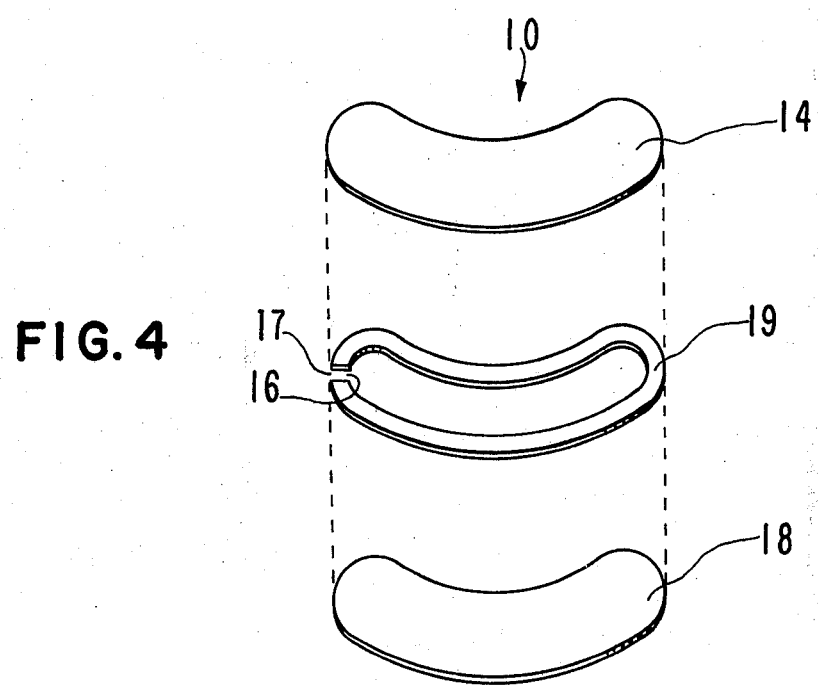
FIG. 4 is an exploded view illustrating three walls prior to their union wherein they act in concert to form a novel ocular drug delivery device.

In FIG. 4 there is illustrated the ocular drug delivery device 10 of FIGS. 2 and 3 in expanded view just prior to the joining of the parts into a composite article of manufacture. In device 10, the parts act in concert as an ocular drug delivery device to effectively meter a drug to the eye and to its surrounding tissues at a controlled and continuous osmotic rate for a prolonged period of time for the management of health and disease. Ocular drug delivery device 10 is comprised of a wall 14, a distant wall 18 and an inner wall for sealingly joining the inner perimeter of wall 14 to wall 19 and wall 18 to wall 14 into sealed relation to form a drug compartment defined by the inner surface of the walls for containing a drug not shown in FIG. 4. Wall 19 has a passageway 16 that extends through wall 19 and ends at orifice 17 to permit the passage of a drug from the compartment to the exterior of the deivce. Ocular drug device 10 can also have passageway 16 through wall 14 or wall 18 in lieu of the passageway through wall 19. Also, the device can be constructed with one or more passageways that are the functional equivalent in an operative embodiment of a single passageway. Passageway 16 can be of any geometric shape, for example, round, triangular, square, elliptical, and the like. Drug 20 as originally contained in device 10 is in solid form, usually a tablet, film, in films mixed with a binder, granules, powdered, a solid suspension, particles in liquid, liquid emulsions, containing solids, solids in solids and the like, and it can be geometric pieces of different shapes such as square, oval, round, rectangular and the like. Drug 20 is soluble in tear fluid, which is substantially an aqueous medium, that is water, and product 20 exhibits an osmotic pressure gradient against external tear fluid 21. The osmotic pressure gradient generally is dependent on the solubility of the product or solute in the fluid and the concentration difference across the wall. This osmotic pressure gradient between drug in the compartment and the external fluid will cause water to permeate through the wall into the compartment of the drug and creating a hydrostatic pressure difference between the inside and the outside of the device. In operation, drug 20 is released through passageway 16 by external fluid permeating through semi-permeable walls 14 or 18 or both into compartment 15 producing a solution of the drug which is released from the device at a rate corresponding to the rate controlled by the permeability of the semi-permeable membrane to the fluid and the osmotic pressure gradient between the drug in the compartment and the exterior fluid which combine to force drug solution from the device.

Figure 5:
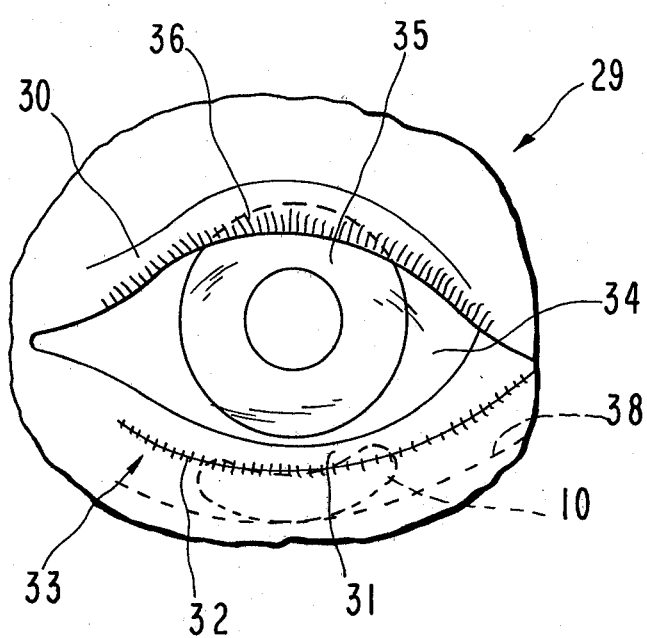
FIG. 5 is a partly diagrammatic, front view of a human eye illustrating an ocular drug delivery device of this invention in an operative position after its insertion into the eye.

Referring to FIG. 5 there is diagrammatically illustrated an ocular drug delivery device 10 positioned in immediate contact with an eyeball 29 for osmotically administering a beneficial drug to eye 29 at an osmotically metered dosage rate. In FIG. 5, eye 29 is comprised of an upper eyelid 30 with eyelashes 32 at the edge of eyelid 31. Eye 29 anatomically is comprised of an eyeball 33 covered for the greater part of its posterior area by a sclera 34 and at its central area by a cornea 35. Eyelids 30 and 31 are lined with an epithelial membrane or palpebral conjunctiva, not shown, and sclera 34 is lined with a bulbar conjunctiva which covers the exposed surface of eyeball 33. Cornea 35 is covered with a transparent epithelial membrane, not shown in this figure. The portion of the palpebral conjunctiva which lines upper eyelid 30 and the underlying portion of the bulbar conjunctiva defines an upper cul-de-sac, not seen in FIG. 5, while that portion of the palpebral conjunctiva which lines lower eyelid 31 and the underlying portion of the bulbar conjunctiva defines a lower cul-de-sac, also not seen in FIG. 5. The novel osmotic drug delivery device 10 of this invention is designed for insertion in the cul-de-sac of the conjunctiva between sclera 34 of eyeball 33 and upper eyelid 30, or device 10 as seen in broken continuous lines is adapted for positioning in the cul-de-sac of the conjunctiva between the sclera 34 of eyeball 33 and lower eyelid 31, generally to be held in drug administration position by the natural pressure of the respective eyelid.

Figure 6:
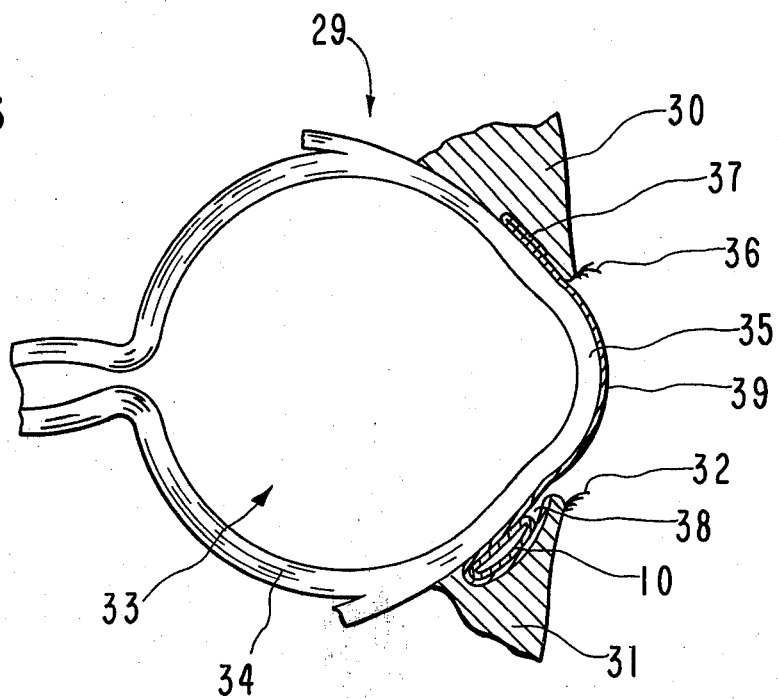
FIG. 6 is a view partly in vertical section and partly diagrammatic of an eyeball and the upper and lower eyelids associated therewith showing the novel ocular product dispensing device of this invention in product administration operative position.

Turning to FIG. 6, which is considered in cooperation with FIG. 5, there is seen a horizontal section through a human eye 29 illustrating an osmotic ocular drug delivery device 10 in drug administration position. Eye 29 is generically comprised of upper eyelid 30 and lower eyelid 31 with their respective eyelashes 36 and 32. Eye 29 is further comprised of eyeball 33, cornea 35 and sclera 34. An upper cul-de-sac 37 and a lower cul-de-sac 38 are defined by a conjunctiva 39. Ocular drug delivery device 10 is positioned in lower cul-de-sac 38 to continuously dispense a metered amount of a drug or a combination of drugs from the device to the eye and its surrounding tissues over a prolonged period of time. In medical operation, after drug leaves the ocular drug delivery device, it is transported to the eye and its surrounding tissues, by physiological processes such as the flow of tear liquid, blinking action of the eyelids, and the like.

Figure 7:
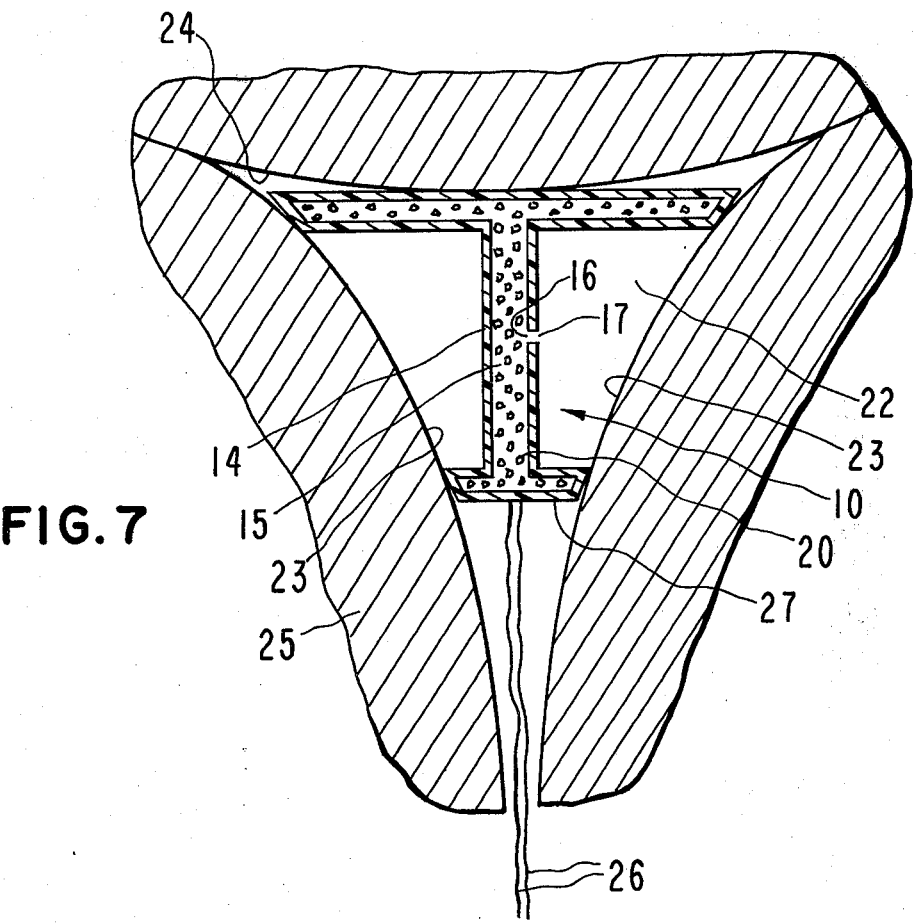
FIG. 7 is a frontal, fragmentary view of a uterine cavity showing a product releasing intrauterine device manufactured in accordance with the invention and positioned in a uterine cavity; and, FIG. 8 is still another embodiment of the invention illustrating a side, fragmentary view of an anal osmotic drug delivery device for releasing a drug in a body cavity.

In FIG. 7 there is graphically depicted another product dispensing device 10 fashioned as an intrauterine contraceptive antifertility delivery device prepared according to the spirit of the invention. Device 10, in this embodiment, is of letter "H" configuration and it is adapted to be located within a uterine cavity and it contacts the sides 23 as well as the fundus uteri 24 of uterus 25. A thread 26 is attached to the trailing end 27 of device 10 for manually removing it from uterus 25. Device 10 is comprised of a wall formed of a semi-permeable membrane surrounding a product compartment 15. A passageway 16 serves as a conduit for the movement of drug 20 from compartment 15 into uterus 23. Compartment 15 is comprised of an antifertility agent 20 that may be soluble in uterine fluid that enters the compartment through the wall and exhibits an osmotic pressure gradient against the fluid, or agent 20 can have limited solubility such as slightly soluble or moderately soluble in uterine fluid confined in the compartment and have mixed therewith either homogenously or heterogenously, an osmotically effective solute that is soluble in uterine fluid and exhibits an osmotic pressure gradient against external uterine fluid. Wall 14 is formed of a semi-permeable material that lets uterine fluid permeate into chamber 15 at a rate controlled by the permeability of the material. In operation, intra-uterine device 10 in one embodiment is comprised of semi-permeable walls and having its compartment charged with a mixture comprised of the antifertility agent progesterone that has limited solubility in an aqueous medium and an aqueous soluble, osmotically effective solute that exhibits an osmotic pressure gradient against the aqueous medium, that is uterine fluid, which device 10 is positioned in a uterine cavity for releasing the antifertility agent at a zero order rate of release to the uterine cavity throughout the major portion of the device's medical history. An insoluble antifertility drug 20 also can be used in a form that is soluble in uterine fluid but physiologically inactive until its release from the device to the uterine cavity wherein it is converted by the uterus and its surrounding tissues, such as the endometrium, myometrium and the like, to a physiologically antifertility active compound. When a soluble form of an antifertility drug is used, it serves as the osmotic solute eliminating the need for an additional solute. Antifertility drug is released through passageway 16 in the fluid that permeates through the wall producing the osmotic solute containing, in the case of a drug of limited solubility, undissolved and some dissolved antifertility agent which is released at an osmotic rate that corresponds to the rate controlled by the permeability of the membrane to the fluid and the osmotic attraction to the fluid as expressed by the osmotic pressure gradient across the wall.

Figure 8:
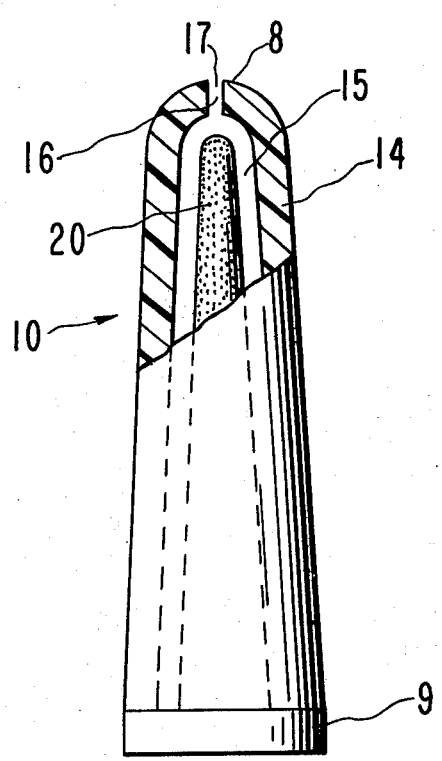

FIG. 8 illustrates another product delivery device 10 of the invention. In FIG. 8, delivery device 10 is designed for administering a drug 20 within a body opening, the anal canal, not shown. Product delivery device 10 is comprised of a semi-permeable film 14 shaped like an obelisk with a lead end 8 and a tailing end 9. Wall 14 surrounds a product compartment 15 which serves as a reservoir 15 for drug 20. Reservoir 15 is comprised of drug 20 in solid form that can be released from device 10 at a metered rate over a prolonged period of time. Wall 14 is suitably formed with a passageway 16 terminating in an outlet 17 for releasing drug from device 10. Wall 14 can be isotropic, wherein the structure is homogenous throughout the cross-section of the wall, or wall 14 can be anisotropic wherein the structure is non-homogenous. In this osmotic suppository device, as with the devices discussed above, drug is released by the operation of the device as fully described in the earlier devices.

In FIG. 9 the present invention is seen in another operative embodiment comprised of a controlled release device 10 for releasing medication at a zero order rate to a preselected environment. Device 10 is suitably adapted for the oral administration of a medication to humans, primates, laboratory animals, farm animals, household animals, avians and sport animals. Device 10 is comprised of a wall 14 formed either fully or in at least a part of a semi-permeable film forming membrane that surrounds medication. A passageway 16, schematically illustrated by dashed lines, releases medication to the exterior of the device. Device 10 has at least one passageway and it can have additional passageways to release the same amount of drug or more drug at various osmotic pumping rates to the host or the enviroment. In FIG. 10 device 10 of FIG. 9 is seen in open section illustrating semi-permeable, non-digestible, non-toxic, biologically inert wall 14 surrounding drug 20 and passageway 16. The amount of drug 20 in the osmotic device will, of course, vary with the host and the length of time it is to remain in the host before it is discharged from the body.

The amount of drug present in the just described device, and similar devices, is initially in excess of the amount that can be dissolved in the fluid present in the interior of the device. Under this physical state, that is, when the drug is in excess, the device will osmotically operate to give essentially zero order rate of release. The rate of drug release pattern can also be varied by selecting different amounts of drug that can be confined in the drug compartment, that is, smaller or larger amounts than is soluble in the fluid in the compartment may be housed therein. That is, the device can contain from 0.05 mg to 25 grams or higher with individual devices containing for example 1 mg, 5 mg, 250 mg, 500 mg, 1.5 g, 3 g and the like. In FIG. 11 device 10 is seen comprised in operation in an outline of a human 22 in stomach 23 osmotically administering drug 20 to the drug receptor.

Figure 13:
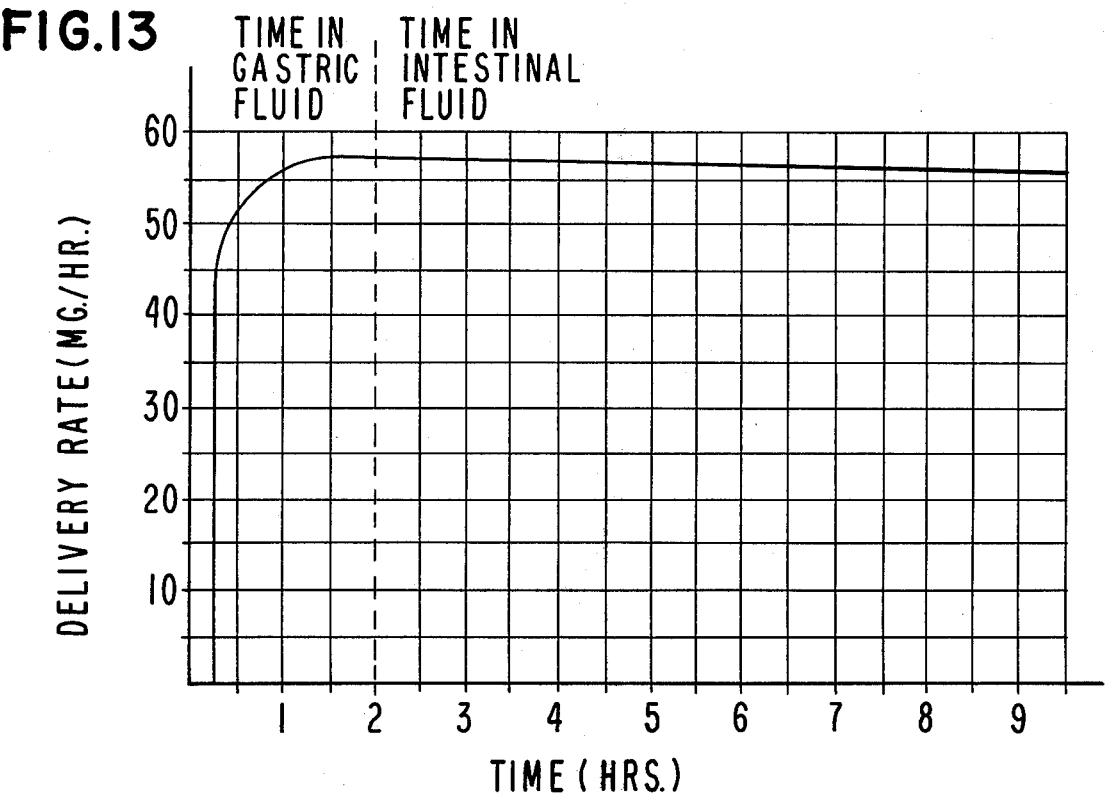
FIG. 13 illustrates a device releasing active agent independent of the pH of the exterior of the device.
Figure 14:
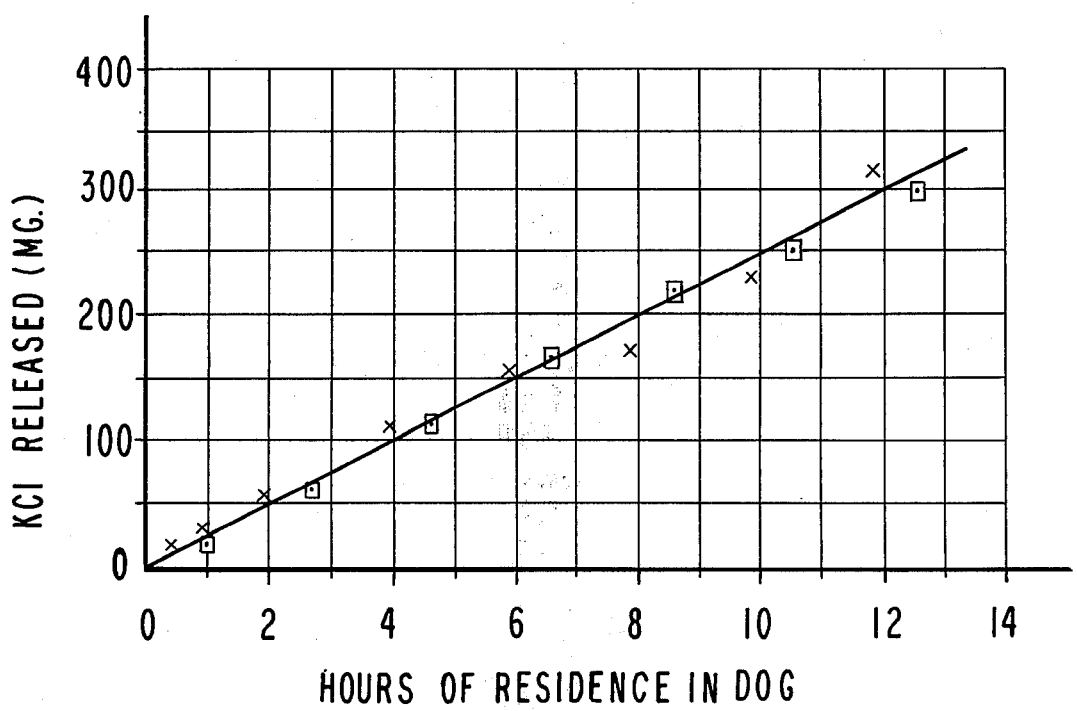
FIG. 14 illustrates in vivo results obtained by using the device.

In FIG. 12 there is presented a graph illustrating an essentially zero order rate of release for an osmotic device made according to the invention. In FIG. 13 there is seen a graph depicting an osmotic device releasing drug at a constant rate independent of the pH of the exterior fluid. The two fluids mentioned on the graph are gastric fluid and intestinal fluid. The gastric fluid had a pH of about 1 to 2 and the intestinal fluid had a pH of about 7 to 8. FIG. 14 shows an osmotic device delivering potassium choride throughout the gastrointestinal tract of dogs. The rate of release for the device during the first two hours was ascertained by assaying devices recovered from the stomach; while, the rate delivered at longer terms was determined by evaluating devices recovered from the intestines.

While the above FIGS. 1 through 14 inclusive are illustrative of various operative, osmotic product delivery devices that can be made according to the invention, it is to be understood that these delivery devices are not to be construed as limiting, as the delivery devices of the invention can take a wide variety of shapes, sizes and forms for administering, for example, the useful agent drug, or the like at controlled rates to different areas, for example, of the body or to different drug receptor sites or to animal body passages or for administering other active agents to other environments. For example, the invention includes oral drug delivery devices such as tablets, pills and capsules, vaginal delivery devices, osmotic implants, osmotic buccal devices, pessaries, prosthesis, artificial glands, cervical rings, intrauterine drug delivery devices of cylindrical, bullet, elliptical, circular, bulbous, loops, bows, or any other geometrical shape that readily lends itself to intrauterine placement such as Birnberg's Bow in U.S. Pat. No. 3,319,625, Comet in U.S. Pat. No. 3,256,878, Majzlin Spring in U.S. Pat. No. 3,397,691, Inhiband in U.S. Pat. No. 3,323,520, Bakunin in U.S. Pat. No. 3,405,711, Shamrock in U.S. Pat. No. 3,077,879, the ring with tail, Ota ring and the like. The devices also include osmotic ocular drug delivery devices of any convenient geometric shape for comfortable retention in the cul-de-sac of the eye such as ellipsoid, bean-shaped, banana-shaped, circular-shaped, rectangular-shaped, trapezoidal, doughnut shaped and the like. In cross-section, it can be doubly convex, concavo-convex, rectangular and the like, as the osmotic ocular device in operation will tend to conform to the configuration of the eye. The general dimensions of the osmotic ocular device can vary with the size of the device and conforming to the amount of drug in the device's drug compartment, the rate at which the drug is to be administered to the eye and by the size of the eye. Satisfactory devices for insertion in the cul-de-sac of the eye generally have a length of 4 to 20 millimeters, a width of 1 to 15 millimeters, and a thickness of 0.1 to 4 millimeters, a reservoir with a diameter of 1.2 to 14.9 millimeters, and contain from 1 microgram to 100 milligrams of drug or more, and the like. The ocular drug delivery device can be made of a material that is biologically inert, non-allergenic and essentially insoluble in tear fluids, or it can be made from a bioerodible, nonallergenic material. The oral osmotic tablets made according to the invention can also be of various conventional sizes such as 3/16 in., 7/32 in., 11/32 in., 7/16 in., ½ in., ¾ in., 1 in., 1¼ in., 1⅓ in., 2⅓ in., 2½ in. and the like smaller or larger dimensions. The oral tablet can also have an elongated shape with a size corresponding to conventional capsule dimensions such as triple zero, double zero, zero, 1 through 8 and the like. Additionally, the novel and useful dispensing device can used for release of a wide variety of active agents and the term agents as used in this specification and the accompanying claims includes any compound, mixture of compounds, composition of matter or mixture thereof which, when dispensed, produces a predetermined beneficial and useful result. The active agents include pesticides, herbicides, germicides, biocides, algicides, rodenticides, fungicides, insecticides, anti-oxidants, plant growth promotors, plant growth inhibitors, preservatives, surfactants, disinfectants, sterilization agents, catalysts, chemical reactants, medicants, fermentation agents cosmetics, foods, nutrients, food supplements, plant foods, drugs, vitamins, plant minerals, sex sterilants, plant hormones, fertility inhibitors, fertility promotors, air purifiers, microorganism attenuators, and other like agents that benefit man, animals, avians, fish and the environment. Also, all of the dispensing devices are of appropriate known shapes and sizes for implantation, insertion or positioning in the desired body cavities, passageways or in the desired environment, such as streams, aquariums, fields, reservoirs, laboratory facilities, manufacturing facilities, transport means and the like.

DETAILED DESCRIPTION OF THE DISCLOSURE

In accordance with the practice of the present invention, it has now been found that the novel delivery device of the invention provides many important advantages over previously-known dissolution operated, diffusional operated, sustained and prolonged delivery devices, of both the non-erodible or bioerodible type and the like. One advantage of the novel device is the ease of construction of the drug delivery device by standard manufacturing techniques into devices of various shapes, sizes and forms for delivering products to a recipient or environment. A more important advantage of the claimed delivery device is that it can be manufactured comprised of a minimum number of parts, that is, a wall and a composition of matter. Another important advantage resides in the ability to manufacture the devices of the invention by standard, conventional methods of manufacture. Other advantages will become apparent to those versed in the art from the specification, the drawings and the accompanying claims.

The wall forming the device of the invention is a material that is semi-permeable, can form films, and does not adversely affect the drug, animal body, or host, for example, a material that is permeable to an external fluid such as water and the like while essentially impermeable to a selected product, drugs, agents or to other compounds in the device. The selectively-permeable material or membrane forming the wall is insoluble in body fluids and non-erodible or it can be bioerodible after a predetermined period with bioerosion corresponding to the end of the active drug release period. In each instance it is semipermeable to solvent but not to solute and is suitable for construction of the osmotic powered device. Typical materials for forming the wall include membranes known to the art as osmosis and reverse osmosis membranes such as commerciallyavailable unplasticized cellulose acetate, plasticized cellulose triacetate, agar acetate, amylose triacetate beta glucan acetate, beta glucan triacetate, cellulose acetate, acetaldehyde dimethyl acetate, cellulose acetate ethyl carbamate, cellulose acetate phthalate, cellulose acetate methyl carbamate, cellulose acetate succinate, cellulose acetate dimethylaminoacetate, cellulose acetate ethyl carbonate, cellulose acetate chloroacetate, cellulose acetate ethyl oxalate, cellulose acetate methyl sulfonate, cellulose acetate butyl sulfonate, cellulose ethers, cellulose acetate propionate, poly(vinyl methyl) ether copolymers, cellulose acetate diethylaminoacetate, cellulose acetate octate, cellulose acetate laurate, methyl cellulose, cellulose acetate p-toluene sulfonate, triacetate of locust gum bean, cellulose acetate with acetylated hydroxyethyl cellulose, hydroxylated ethylenevinylacetate, cellulose acetate butyrate having a viscosity of from about 10 seconds to about 50 seconds, cellulose acetate butyrate containing about 17 percent of combined butyryl and about 29.5 percent acetyl, permselective, aromatic nitrogen-containing polymeric membranes that exhibit water permeability and essentially not solute passage, osmosis membranes made from polymeric epoxides, osmosis membranes made from copolymers of an alkylene oxide and alkyl glycidyl ether, semipermeable polyglycolic or polylactic acid and derivatives thereof, the selectively-permeable membranes of ionically associated polyelectrolytes, the selectively-permeable polymers formed by the coprecipitation of polycation and a polyanion as described in U.S. Pat. Nos. 3,276,586; 3,541,005; 3,541,006; 3,546,142; and 3,173,876; and the like. Generally, membranes having a fluid permeability of 0.01 to 10 cc/cm$^2$ × hour or day/or higher at atmospheric pressure against a saturated product solution or saturated solute solution at the temperature of use while simultaneously possessing a high degree of impermeability to the product or solute are useful for manufacturing the devices of the invention. Also, among the suitable semi-permeable membranes operable for the purpose of the invention are film forming membranes that possess a water sorption greater than one percent and less than forty percent by weight at ambient temperatures with a presently preferred semipermeable membranes having a water sorption of greater than five percent and less than thirty percent by weight at ambient temperatures. Of course, other semi-permeable membranes operable for the purposes of the invention can also be used within the spirit of the invention.

Representative of compositions of matter that can be released from the device and can function as a solute are without limitation those compositions soluble in fluids inside the compartment. The fluid is originally present in the environment of use in various forms, for example, such as an aqueous type fluid such as tear fluid, tissue juices, extra-cellular fluid, intra-cellular fluid, water, organic solvents, mixed solvent systems and the like. The expression "composition of matter" as previously noted and as used in this disclosure is meant to include the terms product, useful active agent, beneficial agent and the like, and these terms are deemed as functionally equivalent for the present invention. These compositions, in one embodiment, are both useful to environment or host and preferably osmotically effective as solutes since they can generate a solvent concentration gradient between the exterior medium and the medium inside the device. In the specification and the accompanying claims, useful active agent embraces the term "drug" and broadly includes physiologically or pharmacologically active substance for producing a localized or systemic effect or effects in mammals including humans and primates, avians, valuable domestic household, sport or farm animals such as sheep, goats, cattle, horses, etc., or for administering to laboratory animals such as mice, rats, guinea pigs and the like. That is, the novel osmotic drug delivery device can be used for administering drugs that are physiologically or pharmacologically active at a point in near relation to the osmotic drug delivery device, or, for administering a systemically active substance which will produce a physiological or pharmacological response at a site remote from the point of application of the osmotic drug delivery device. The active agents that may be administered include inorganic and organic compounds without limitation, those materials that transport across a vessel, for example, drugs acting on the central nervous system such as hypnotics and sedatives, mixtures thereof such as pentobarbital sodium, phenobarbital, secobarbital, thiopental, etc., heterocyclic hypnotics such as dioxopiperidines, and glutarimides, hypnotics and sedatives such as amides and ureas exemplified by diethylisovaleramide and α-bromoisovaleryl urea and the like, and hypnotic and sedative urethanes, disulfanes and the like, psychic energizers such as isocarboxazid, nialamide, phenelzine, imipramine, tranylcypromine, pargylene and the like, tranquilizers such as chloropromazine, promazine, fluphenazine reserpine, deseripidine, meprobamate, benzodiazepines such as chlordiazepoxide and the like, anticonvulsants such as primidone, diphenylhydantoin, ethyltoin, pheneturide, ethosuximide and the like, muscle relaxants and anti-parkinson agents such as mephenesin, methocarbomal, trihexylphenidyl, biperiden, levo-dopa, also known as L-dopa and L-β-3-4-dihydroxyphenylalanine and the like, analgesics such as morphone, codeine, meperidine, nalorphine and the like, antipyretics and anti-inflammatory agents such as aspirin, salicylamide, sodium salicylamide and the like, local anesthetics such as procaine, lidocaine, naepaine, piperocaine, tetracaine, dibucane and the like, antispasmodics and antiulcer agents such as atropine, scopolamine, methscopolamine, oxyphenonium, papaverine, prostaglandins such as $PGE_1$, $PGE_2$, $PGF_{1\alpha}$, $PGF_{2\alpha}$, PGA and the like, anti-microbials such as penicillin, tetracycline, oxytetracycline, chlorotetracycline, chloramphenicol, sulfonamides and the like, antimalarials such as 4-aminoquinolines, 8-aminoquinolines and pyrimethamine, hormonal agents such as prednisolone, cortisone, cortisol and triamcinolone, androgenic steroids, for example, methyltestosterone, fluoxmesterone and the like, estrogenic steroids, for example, 17β estrodiol and ethinyl estradiol, progestational steroids, for example, 17α-hydroxyprogesterone acetate, 19-nor-progesterone, norethindrone and the like, sympathomimetic drugs such as epinephrine, amphetamine, ephedrine, norepinephrine and the like, cardiovascular drugs, for example, procainamide, amyl nitrite, nitroglycerin, dipyridamole, sodium nitrate, mannitol nitrate and the like, diuretics, for example, chlorothiazide, flumethiazide and the like, antiparasitic agents such as bephenium hydroxynaphthoate and dichlorophen, dapsone and the like, neoplastic agents such as mechlorethamine, uracil mustard, 5-fluorouracil, 6-thioguanine, procarbazine and the like, hypoglycemic drugs such as insulin, isophane insulin suspension, protamine zinc insulin suspension, globin zinc insulin, extended insulin zinc suspension, and other like insulins derived from animal and synthetic origin, tolbutamide, acetohexamide, tolazamide, chloropropamide and the like, nutritional agents such as vitamins, essential amino acids, essential fats and the like, eye drugs such as pilocarpine base, pilocarpine hydrochloride, pilocarpine nitrate, and other beneficial active agents.

The composition, useful agents drug or the like can also be in various forms, such as uncharged molecules, components of molecular complexes, pharmacologically acceptable salts such as hydrochloride, hydrobromide, sulfate, laurates, palmatates, phosphate, nitrate, borate, acetate, maleate, tartrate, oleates, salicylates, and the like. For acidic drugs, salts of metals, amines, or organic cations, for example quaternary ammonium can be employed. Furthermore, simple derivatives of the drug such as esters, ethers, amides and the like which have solubility characteristics that are suitable for the purpose of the invention can also be used herein. Also, a product, agent or drug that is water insoluble can be used in a form that is a water soluble derivative thereof to effectively serve as a solute, and on its release from the device it is converted by enzymes, hydrolyzed by body pH, or other metabolic processes to the original form or to a biologically active form. Additionally, drug or other formulation within the devices chamber can have various art known forms such as solution, dispersion, paste, cream, particle, granule, tablet, emulsions, suspensions, powders and the like.

Various osmotically-effective solutes including organic and inorganic compounds are advantageously used when it is desired to release a composition, product, agent, drug or the like having limited solubility in the solvent of the environment and now present in the compartment, for example, water from the device. The term "limited solubility" as used herein means that the compound as a solubility of about less than 1% by weight in the internal fluid present in the compartment, that is, the ratio of the weight of the compound in solution to the weight of the water of that solution is less than 1%. The term includes low, slightly and moderate solubility of the composition in the fluid. The osmotically-effective compounds or solutes confined in the device are a substantial motive force of the device and they exhibit an osmotic pressure gradient against an external fluid across the membrane while the membrane is substantially impermeable to the passage of the osmotically-effective solute to prevent loss thereof through the membrane. The solutes are conveniently used by dispensing or homogenously or heterogenously mixing a solute or a mixture of solutes with the composition, active agent, product or the like either before they are charged into the compartment or by self mixing after charging a solute and composition into the compartment. In operation, these solutes osmotically attract fluid into the device to produce a solution of the solute which is released from the device concomitantly transporting therewith undissolved and dissolved composition, product, drug or the like. Various osmotically-effective solutes include compounds such as magnesium sulfate, magnesium chloride, sodium chloride, lithium chloride, potassium sulfate, sodium carbonate, sodium sulfite, lithium sulfate, potassium chloride, calcium bicarbonate, sodium sulfate, calcium sulfate, potassium acid phosphate, calcium lactate, d-mannitol, urea, inositol, magnesium succinate, tartaric acid, soluble carbohydrates such as raffinose, sucrose, glucose, α-d-lactose monohydrate, mixtures thereof and the like. The solid solute, present initially in excess, can be in any suitable physical form such as particles, crystals, pellets, tablets, strips, film, granules and the like.

In one embodiment for the release of drug having limited solubility in the entering water, drug particles released from a dissolving drug core are essentially stably suspended in a solution and remain in this phase until released from the device. This embodiment is effected by forming a drug core formulation comprised either of a protective colloid or a dispersant for the drug and an osmotically-active solute that is preferably a non-ionic solute to substantially avoid any drug particle coagulation in solution. A spontaneously dispersed drug can be prepared by predispersing the selected drug in an aqueous solution of, for example, a water-soluble gum such as poly(vinyl pyrrolidone), soluble starch, carboxymethylcellulose, poly(vinyl alcohol), gelatin, and the like, and then spray-drying the mixture to produce a dry powder. Spotaneous dispersibility of the drug can also be achieved by granulating in a coating pan, fluidized bed or the like a mixture of drug and the osmotically-active solute in the present of a solution of non-toxic surface active agents such as glyceryl monostearate, lecithin, bile acid salts and commercially-available Tween$^R$, Span$^R$, Triton$^R$ surfactants, such as sorbitan mono-oleate, polysorbate 80 and the like.

The drug particles in suspension suitably mixed with osmotic solute and preferably optionally mixed with a therapeutically acceptable surfactant is released from the device free of any needed stirring rate dependent force. The drug particles in this suspension are manufactured smaller than the size of the passageway to insure their free passage to the exterior of the device. Generally, any suspension will freely move through the passageway if the maximum particle diameter is from about ¾ to 1/10 or smaller in size than the diameter of the passageway. For example, drug particle relative in dimension to the just-described passageway can be from 50 microns to 5 microns or less to insure their passage therethrough.

In the novel and useful embodiment just described, drug particles immediately adjacent to the area of dissolving osmotically-active solute are first released from the device. This occurs under osmotic kinetics when particles of drug and solute are in intimate admixture and the rate of drug release from such a device can be computed from the following formula:

$$R_D = \frac{f_D}{1-f_D} \cdot Q_{OSM} C_0$$

wherein $R_D$ is the drug delivery rate expressed as mg/hr, $f_D$ is the weight fraction of drug in the core, $Q_{OSM}$ is the rate of osmotic uptake of water expressed in ml/hr, and $C_0$ is the saturation concentration of osmotically active solute expressed as mg/ml. The active agent can also be released from the device in a solubilized form of micelle structure as described in *Physical Pharmacy*, by Martin et al, pages 462 to 465, Second Edition, 1969, published by Lea and Febiger. Additionally, insoluble drug can be mixed with a complexation agent to provide a soluble complex as described in just-mentioned references at pages 325 to 352.

Additionally, the composition or the like and composition solute can be used in a mixed form by mixing the composition or product with a binder. The product in powdered, granular, pieces and the like form, is homogeneously or heterogeneously dispersed in the binder which binder is water soluble or water insoluble but will release the product on contact with water. Typical water soluble binders include poly(ethylene glycol), gelatin, agar, carboxycellulose, ethylmethylcellulose, poly(vinyl alcohol), poly(vinylpyrrolidone), water soluble starch derivatives and the like. Typical water insoluble binders that can comprise about 1 to 50% of the composition include cellulose acetate, poly(urethane), epoxides and other insoluble binders that permit the free movement of water into the pores of the structure to transport the product from the binder.

The amount of composition present in the device, whether soluble, a derivitized soluble form thereof, is generally non-limited and it is an amount larger than or equal to the amount of the composition that is necessary to osmotically operate the device and on its release from the device is effective for bringing about the product's desired effect. Since the invention contemplates a variety of devices of various sizes and shapes, for a variety of uses, there is no critical upper limit on the amount of product incorporated in the device. The lower limit will depend on osmotic activity, the span of the release of the product and the activity of the product. Generally, the device will contain about 0.01% to 90% or higher of a product or a mixture of product and solute based on the weight of the product or product solute to the volume of the device, and the like. Typically, the device can be of such size and shape to release 0.01 cc to 5 cc lesser or higher amounts of product contained in the fluid per hour, day, month or longer, such as 1 cc to 10 cc of product solution for 1 to 10 days, and the like.

The expressions "passageway" and "passageway communicating with" as used herein are comprised of those means and methods suitable for osmotically releasing the product from the device under the osmotic pumping rate of the device. The expression includes the following osmotic passageways: an aperture, orifice, bore, porous element through which product can migrate, hollow cellulose acetate fibers suitable for passing the product, capillary tubes, and the like. The expression also includes bioerodible materials that erode in the environment of use to produce an osmotic passageway of precontrolled dimensions. Typical bioerodible materials suitable for forming a passageway include erodible poly(glycolic) and poly(lactic) fibers, erodible gelatinous filaments, poly(vinyl alcohol), and the like.

The rate of release of a product from the device can easily be determined by those skilled in the art by standard procedures. In this manner, particular materials used for the device wall and the product or product solute can be selected for manufacturing the device. Generally, the rate of release of a product from the device is easily ascertained by calculating or measuring the amount of product released per unit time expressed as $Q_p/t$ wherein $Q_p$ is the quantity of product released in grams in unit time $t$ hours. The thermodynamic driving force for fluid permeation, that is, the driving energy for attracting the external fluid into the device, is the difference in free energy of the fluid in the two solutions outside and inside the device, which energy can be related to the difference of the fluid concentration and the osmotic pressure. In the devices of the invention, the volume of solution delivered contains a volume of agent or drug inversely proportional to the agent's or drug's density $\rho$ in grams per cc which indicated the desirability of a correction factor in the expression for the volume release rate $V/t$ from the osmotic agent or drug solution released from the device, solubility of product is defined as the solubility of the product in grams, $g$, per cubic centimeter, cc of solvent fluid or $S$ expressed in $g/cc$. The pumping rate of solution $V/t$ from the device is conveniently expressed by combining $Q/t$ and $S$ and $\rho$ to give the equation $$\frac{V}{t} = \frac{Q_p}{t} \times \frac{1}{S}\left(1 + \frac{S}{\rho}\right)$$

wherein the solution pumping rate in cc/hr, $Q$, $t$, $\rho$ and $S$ are as previously set forth. The osmotic volume flow $V/t$ of solution from the device is conveniently expressed as $$\frac{V}{t} = k\frac{A}{h}(\sigma\pi - \Delta P)$$

wherein $A$ is the total area of the membrane of the device, $h$ is the thickness of the membrane, $\sigma$ is the osmotic reflection coefficient of the membrane for the solute, and as used hereafter by way of example it is assumed to be equal to unity as is valid for ideal semipermeable membranes, $\pi$ is the osmotic pressure of the agent drug solution, $\Delta P$ is the hydrostatic pressure difference between the internal and external pressure and $k$ is the permeability of the membrane as defined immediately below. The permeability of the membrane to an external fluid is described by the known equation $$k = \frac{\text{volume} \times \text{thickness of membrane}}{\text{area} \times \text{time} \times \pi}$$

wherein the thickness of the membrane is expressed in mils, the area in $cm^2$, volume is the permeated volume in cc, and $\pi$ is the osmotic pressure approximated by van't Hoff's Law and expressed in the formulae given as follows: $\pi = C \times i \times R \times T$ wherein $C$ is the concentration of the product in moles per liter, $i$ is the number of ions or particles per molecule of the product, $R$ is the gas constant and $T$ is the absolute temperature in degrees Kelvin. *Reverse Osmosis Membrane Research*, Edited by Lonsdale and Podall, pages 17 to 42, 1972 published by Plenum Press, New York.

The size of the passageway in the devices of the invention is designed so that the rate of product delivered, $(Q_D/t)$, attributed to diffusion in the fluid present in the passageway is always less than the rate of pumping $(Q_P/t)$ through the passageway. The expression $Q_D$ is the amount of drug expressed in grams diffusing through the passageway in $t$ time, expressed in hours, and $Q_P$ is the amount of product delivered by pumping in the time $t$ in units of grams/hours. The quantity $(Q_P/t)$ is determined by the amount of fluid which permeates through the membranes as controlled by the permeability of the membrane and its thickness and the osmotic difference across the membrane. In the devices of the invention, $Q_P/t)$ is greater than $(Q_D/t)$ which assures that the device is essentially an osmotic powered device. By combining the above equations, it s immediately obvious that the product rate of release from the device of the invention is encompassed by the following equation:

$$\frac{Q_p}{t} = k\ \frac{A_m}{t_m} \times \text{osmotic pressure} \times \frac{\text{drug solubility}}{1 + \frac{\text{drug solubility}}{\text{drug density}}}$$

wherein $A_m$ = area of membrane, $t_m$ = thickness of membrane, and wherein $k$ is the permeability coefficient defined as cc of fluid/hr $cm^2 \times$ thickness of membrane/osmotic pressure.

The above presentation along with methods for measuring flow rates and the like are described in *Encyl. Polymer Sci. Technol.*, Vol. 9, pages 659 to 688, 1968 published by Interscience Publishers, in *Encyl. of Chem. Technol.*, Vol. 14, pages 345 to 356, 1967, published by Interscience Publishers, Inc., and in *Desalination by Reverse Osmosis*, Merten, U., pages 15 to 54, 1966, published by the M.I.T. Press, Cambridge, Mass.

The operative size of the passageway in any given osmotic device made according to the mode and manner of the invention can easily be ascertained from the immediate equation wherein the maximum size of the passageway is $$\frac{A_s}{h} = \frac{1}{F}\ \frac{Q_p}{t} \times \frac{1}{DS}$$

wherein $A_s$ is the cross sectional area of the passageway, $h$ is the length of the passageway and for a device with a passageway through a membrane it corresponds to the thickness of the membrane, $D$ is the diffusional coefficient of the active agent in the solution osmotically attracted into the device, $F$ is the ratio of mass of active agent delivered per unit time conveniently stated as $Q_p/t$, to the mass of agent or drug $Q_d/t$ delivered per unit time through the solution in the passageway in the absence of any measurable osmotic pumping so the ratio of $$F = \frac{Q_{p/t}}{Q_{d/t}}$$

is always at least 2 and preferably greater than 10 and usually in a presently-preferred range of from 10 to 1000, wherein $S$ is as previously defined.

The size of the passageway is constructed with a minimum size so that size thereof is sufficiently large to essentially prevent hydrostatic pressure $\Delta P$ buildup in a device. This minimum size can be determined, for example, for a cylindrical passageway by the following general equation $$A_s = \left[\frac{LV}{t} \times 8\pi \times \frac{\eta}{\Delta P}\right]^{1/2}$$

wherein $A_s$ is the cross-sectional area of the passageway, $\pi$ is 3.14, $\eta$ is the viscosity of the solution in the passageway leaving the device, $\Delta P$ is hydrostatic pressure difference between the inside and the outside of the device, at which the device osmotically pumps the agent without substantially deforming or rupturing the wall of the device and it is preferably less than 20 atmospheres, $L$ is the length of the passageway and $V/t$ is as previously defined.

The novel and useful devices of the invention are made with at least one passageway. The number of passageways for any device is easily ascertained as $A_s \geq N \cdot A_h$ wherein $A_s$ is as previously defined as the total cross sectional area of the passageway and it is equal to or larger than the number of passageways $N$ times the area $A_h$ for $N$ indicated passageways. When the devices of the invention are fabricated with more than one passageway, the number and position of these passageways is determined by following the teachings disclosed therein, for example, by measuring the delivery rate from the device as passageways are added to ascertain that any unusual convection of fluids is not perturbing and altering the usual form of product delivery from the device.

The solubility of a product in a fluid can be determined by various art known techniques. One method consists in preparing a saturated solution, for example, a fluid plus product and ascertaining by analysis the amount of product present in a definite quantity of the fluid. A simple apparatus for this purpose consists of a test tube of medium size fastened upright in a water bath maintained at constant temperature and pressure, for example, 37.5°C and one atmosphere. The fluid and product are placed in the tube and stirred by means of a motor driven rotating glass spiral. After a given period of stirring, a definite weight of the fluid is analyzed and the stirring continued for an additional period of time. If the analysis shows no increase of dissolved substance after successive periods of stirring, in the presence of excess solid product in the fluid, the solution is saturated and the results are taken as the solubility of the product in the fluid. Numerous other methods are available for the determination of the solubility of a product in a fluid. Typical methods used for the measurement of solubility are chemical analysis, measurement of density, refractive index, electrical conductivity, and the like. Details of various methods for determining solubilities are described in *United States Public Health Service Bulletin*, No. 67 of the Hygienic Laboratory; *Encyclopedia of Science and Technology*, Vol. 12, pages 542 to 556, 1971, McGraw-Hill, Inc., *Encyclopaedic Dictionary of Physics*, Vol. 6, pages 545 to 557, 1962, Pergamon Press Inc., and the like.

The term "permeation" or "permeation process" as used herein means the transfer or migration of the external fluid through the wall of the device into the product compartment. The permeation process generally depends on the thermodynamic activity gradient for the medium across the wall, and the properties of the rate controlling membrane. These latter properties are reflected in the solubility and the diffusity of the fluid through a homogenous membrane or through a medium in the pores of a heterogenous membrane. See for example *Diffusion in Polymers*, by Crank, J. and Park, G. S., Chapter 8, pages 259 to 313, 1968, published by Academic Press, N.Y.

The flux of an external fluid, for example, the rate of water vapor transmission through various wall forming materials is determined by using the procedures in *Diffusion in Polymers*, pages 1 to 39 and then expressing the results of WVTR or water vapor transmission rate through a film in grams/100 in$^2$/24 hr/one mil thick film. Known WVTR values can also be found in *Plastic Film Technology*, Park, W. W. R., 1969, published by Van Nostrand-Reinhold Inc., and in *Diffusion in Polymers*, pages 274 to 276. Typical values are set forth in Table 1 immediately below wherein film is the material and WVTR is as defined.

TABLE 1

| Film | WVTR |
| --- | --- |
| Polyvinyl alcohol | 100 |
| Polyurethane | 30 – 150 |
| Methylcellulose | 70 |
| Cellulose acetate | 40 – 75 |
| Ethylcellulose | 75 |
| Cellulose acetate butyrate | 50 |
| Polyvinylchloride, cast | 10 – 20 |
| Polyvinylchloride, extruded | 6 – 15 |
| Polycarbonate | 8 |
| Polyvinylfluoride | 3 |
| Ethylene vinylacetate | 1 – 3 |
| Polyesters | 2 |
| Cellophane, polyethylene coated | >1.2 |
| Polyvinylidene fluoride | 1.0 |
| Polyethylene | 0.5 – 1.2 |
| Ethylene propylene copolymer | 0.8 |
| Polypropylene | 0.7 |
| Polyvinyl chloride, rigid | 0.7 |

The novel devices of the invention are fabricated by standard techniques. For example, in one embodiment the product, or the product and a binder and/or a solute is mixed or formulated into a solid, semi-solid or the like form by conventional methods, such as ballmilling, calendering, stirring, shrinking, rollmilling and the like and then charged into the compartment of the device. The wall material forming the device and having the product contained therein can be formed into a given shaped device, in one embodiment, by molding or casting the one wall, pressing a middle wall thereto, charging the compartment, and then sealing a third wall to form the device. A passageway leading through one wall is fabricated by drilling, punching, laser drilling, casting around a fiber that is removed therefrom, casting around a wire of known diameter that is then removed, cutting, or depositing a tube in one wall during assembly of the device. See commercially-available procedure analyses described by Coherent Radiation, Palo Alto, California and TRW Instruments, El Segundo, California. The device can also be formed of a continuous wall by pouring, casting or the like, a wall forming material around a removable mold of any desired shape. The devices when formed of more than one wall can be joined by various joining techniques, such as high frequency electronic sealing that provides clean edges and firmly sealed devices. By using, for example, high frequency sealing, the wall forming materials flow melt at the point of contact to suitably join the walls into a composite article of manufacture. The ability to design and shape the wall into an osmotic device of highly reproducible shapes of controllable composition, readily results in the fabrication of osmotic delivery devices with controlled characteristics and thus overcome a significant disadvantage of previously-described devices. Other standard manufacturing procedures are described in *Modern Plastics Encyclopedia*, Vol. 46, pages 62 to 70, 1969, and these are well-known to those skilled in the art and can be used to fabricate the osmotic delivery devices of the invention.

The novel and oral osmotic drug delivery devices of the invention can be of any preselected shape and in a presently-preferred embodiment it is of standard tablet configuration. Generally, the tablet is discoid in shape, although it may be oval, oblong, round, cylindrical, triangular and the like. The upper and lower surfaces may be flat, round, concave, convex or the like. The oral osmotic tablet may be manufactured by standard manufacturing methods such as the wet granulation method, drug granulation, compression, slugging and the like. The oral tablet may be coated with a semi-permeable osmotic membrane of varying thickness by pan coating, spray-pan coating, laminating coating techniques, dip coating, Wurster air-suspension coating, and the like. The oral device may be glazed, polished, colored and the like to esthetically enhance the oral device. These procedures and similar manufacturing techniques are known to the art in *Remington's Pharmaceutical Science*, Fourteenth Edition, pages 1649 to 1968, 1970, published by Mack Publishing Company, Easton, Pennsylvania, and in *The Theory and Practice of Industrial Pharmacy*, by Lachman et al, pages 197 to 225, 1970, published by Lea and Febiger, Philadelphia, Pennsylvania.

The following examples are merely illustrative of the present invention and they should not be considered as limiting the scope of the invention in any way, as these examples and other equivalents thereof will become apparent to those versed in the art in the light of the present disclosure, drawings and the accompanying claims.

EXAMPLE 1

An osmotic ocular drug delivery device for the continued release of pilocarpine nitrate at a release rate of 100 $\mu$/hr from a device with a 1.2 cm² membrane area and 3 mil membrane thickness, with the pilocarpine nitrate having a solubility of 0.250 g/ml in water and the ocular device designed with an elliptical shape is constructed as follows: first, the predetermined pumping rate of the device for releasing pilocarpine nitrate is calculated from the above presentations as follows $4.10^{-4}$ ml/hr according to the equation $$100 \; \mu g/hr \times \frac{1}{0.250 \; g/ml}$$

which requires a corresponding water flux through the membrane 3 mil thick and 1.2 cm²

$$\frac{4.10^{-4} \; ml \times 3 \; mil}{hr \times 1.2 \; cm^2}.$$

The flux can be expressed for pilocarpine nitrate through a 1 cm² area with 1 mil thickness under the osmotic driving force of pilocarpine nitrate as $$10^{-3} \; \frac{cc \cdot mil}{hr \cdot cm^2}.$$

The driving force of pilocarpine nitrate for the device is expressed as the osmotic pressure $$\pi = 25 \times 2 \times \frac{250 \; g}{liter \times 270 \; g/mole}$$

where 2 is the number of ions in a molecule of pilocarpine nitrate and 25 is the product of the gas constant times the absolute temperature of about 300°K. From this experiment $\pi$ was found to be about 50 atmospheres. From an osmotic system comprised of a cellulose acetate wall and the osmotically effective solute potassium sulfate with $\pi$ of 58 atm, the water flux through the cellulose acetate was measured at $$10 \times 10 \; \frac{cc \cdot ml}{hr \cdot cm^2}.$$

The device of this example is constructed with a membrane having a water permeability about 10 times less than cellulose acetate, that is, a semi-permeable wall made of polyurethane with the device's orifice having a length of 1 mm and a diameter of 2 mil to produce the desired constant rate of drug release. The osmotic orifice herein is integral with the osmotic semi-permeable wall, and it keeps its uniformity and configuration during the osmotic dispensing period.

EXAMPLE 2

An osmotic drug delivery device is manufactured according to the procedure of Example 1 wherein the conditions were as described except that in Example 2 the device had an orifice length of 3 mils, an orifice area of $16.5 \times 10^{-7}$ cm², an orifice having a radius of $0.73 \times 10^{-3}$ cm, an orifice diameter of 0.6 mil, a pressure difference across the orifice of $8 \times 10^{-5}$ atm, and the release rate of 100 $\mu$/hr.

EXAMPLE 3

An osmotic drug delivery device manufactured with an ellipse shape and comprised of two outer semipermeable walls each fused to an inner middle wall having a center area defining a space and which middle wall extends around and interbonds the internal perimeter of the two outer walls to form an osmotic drug delivery device having a drug compartment for containing a drug and a passageway through positioned between the middle and one of the outer walls is manufactured as follows: first, an essentially uniform wall of a semipermeable material is formed by throughly mixing commercially available polyurethane ether, commercially available as Estane[R] 5714 from the B.F. Goodrich Co., with tetrahydrofuran in a concentration ratio of 25% of polyurethane to 75% of the solvent and casting the slurry into a silicone release paper substrate. The solvent is allowed to evaporate at room temperature and the film warm-air dried to yield a drug release rate wall material about 2.5 mils thick. Two walls, each about 16 mm × 6.75 mm are pressed from the film for use as the semi-permeable walls of the device. Next, a middle wall is prepared by mixing ethylene vinylacetate, methylene chloride and Food drug and cosmetic blue lake in a percent ratio of 20 to 80 to 9.1 and the ingredients thoroughly mixed in a commercial laboratory v-blender. The slurry is then cast onto a silicone release paper substrate, and the solvent evaporated at room temperature. The film is warm air dried to yield a film 4.2 ± 0.3 mils thick. Next, this film is press cut into an ellipse having the same dimensions of the just press cut polyurethane walls. The middle wall is press cut with the center area punched out to yield a continuous ellipse defining an opening. Then, onto one of the semipermeable walls is placed the middle wall and these two walls placed into a conventional standard vacuum laminator. Nest, a vacuum is pulled to 29 inches of mercury and held for three minutes. At the end of three minutes, a high flux radiant heater is positioned over the walls and heated for about 15 seconds or until the temperature reaches 90°C. At the end of the heating, a pressure head is applied to the two walls and a pressure of 15 lb. applied for 45 seconds to firmly seal the two walls, and the vacuum released.

Next, a drug core compressed of water soluble pilocarpine nitrate dispersed in ethylene vinylacetate is placed into the compartment, and a passageway formed by laying a porous silk suture over the middle ring and the third wall placed in contact with the middle wall. The three walls are then subjected to a vacuum, and heat laminated as just described to produce a composite article of manufacture. The osmotic drug delivery device, when placed into an adult human eye, will administer 30 µ/hr of pilocarpine.

EXAMPLE 4

An osmotic drug delivery device for the prolonged, continuous and controlled rate of drug administration is manufactured according to the procedure of Example 3 with the device comprised of two outer walls each having an anular ring bonded thereto and a hollow fiber positioned between the two outer walls. The hollow fiber connects the exterior of the device with the interior compartments containing pilocarpine nitrate. The two walls with their annular rings are sealed at the annular ring interface as in Example 3.

EXAMPLE 5

An osmotic delivery device for releasing potassium chloride at an osmotically-controlled rate was made as follows.

First, 500 mg of commercially-available potassium chloride was compressed by standard compression techniques using a ⅜ inch punch. The compressed mass was then coated with commercially-available cellulose acetate available as E-320 from Eastman Kodak by using the Wurster Air suspension technique. A 5% polymer solution in dioxane was used in the Wurster apparatus to produce the coating which had a final thickness of about 10 mils. A number of drug delivery devices were made using this procedure and a passageway was placed in each device, that is, a passageway through the semi-permeable membrane either by mechanical drilling or laser drilling techniques. The diameter of the passageway ranges from 3.9 mils to 11.0 mils. The osmotic device had a constant zero order rate of release of 26 mg per hour with a variation of about ±5%. The average results for this device are shown in FIG. 12. Similar osmotic devices can also be made wherein the diameter of the passageway ranges from 0.1 mils or less to 20 mils or higher for each device with at least one passageway in the device, consistent with the other teachings of this specification as set forth herein.

EXAMPLE 6

A non-stirring rate dependent osmotic device that releases agent independent of pH of the environment was prepared as follows: First, 700 mg of sodium phenobarbital was compressed into capsule-shaped cores and then dipped coated in a bath of cellulose acetate E-376 commercially-available from Eastman Kodak. The cellulose acetate was mixed in dioxane solution and the final coating applied to the barbiturate was about 12 mils thick. The devices were made with a small wire that was removed after the devices were dried to give a passageway having a 0.4 mm diameter. The osmotic release rate for this device was measured in simulated gastric juice and simulated intestinal juice made without enzyme as described in *The United States Pharmacopoeia*, Eighteenth Revision, pages 1026 and 1027, 1970. The results as shown in FIG. 13 demonstrated drug release independent of pH and free of any stirring rate dependency.

EXAMPLE 7

The devices made according to Example 5 were orally administered to dogs and the release rate measured over a prolonged period of time. The devices were first weighed and color coded. A series of eight devices was administered to two dogs at regular time intervals. After 12 hours, the dogs were sacraficed, the devices uncovered, rinsed, dried and reweighed. The amount of drug released from each device as determined by weight difference is plotted in FIG. 14 wherein the X and squares represent the dogs. For these devices, the average rate of drug release ascertained from the slope of the line was calculated as 24.3 mg/hr.

EXAMPLE 8

Following the procedure of the above examples an oral, osmotic, unit dosage drug dispensing device was manufactured according to the previously described techniques. When the device containing drug was placed in an aqueous environment, water permeated through the semipermeable membrane and dissolved drug to the point of saturation. The water uptake of the device was constant and proportional to the osmotic pressure of the saturated drug solution in the compartment as controlled by the semi-permeable membrane. As more water entered the compartment it became saturated with drug and a thermodynamic steady state zero order rate of drug release resulted. The steady state was maintained throughout the presence of the excess drug in the compartment, which state continually produced the saturated drug solution. Finally, when all the excess drug is released from the device, rate of release from the device gradually declined until the remaining drug is released therefrom.

The novel, osmotic product delivery device of this invention employs a unique means which facilitates the attainment of precisely-conducted product release rates in the environment of use. The unique osmotic devices use osmotic membranes that are nonporous and selectivly permeable as they let water along pass while remaining essentially impermeable to the passage of other substances. Additionally, they release active agent at a rate controlled by the osmotic device. While there has been described and pointed out the fundamental novel features of the invention as applied to the presently preferred embodiments, those skilled in the art will appreciate that various modifications, changes and omissions in the osmotic product delivery devices illustrated and described can be made without departing from the spirit of the invention.

What is claimed is:

1. An osmotic device for the continuous dispensing of an active agent to an environment of use, said device comprising:
    a. a shaped wall formed of a semipermeable material that maintains its integrity during the dispensing period and which is characterized as permeable to the passage of an external fluid in the environment of use and substantially impermeable to the passage of the active agent, the wall surrounding and forming;
    b. a compartment containing the active agent that is soluble in the external fluid, and which agent exhibits an osmotic pressure gradient across the wall against the external fluid;
    c. a passageway in the wall for dispensing agent from the device, said passageway having a maximum cross-sectional area, $A_s$, defined as $$\frac{L}{F} \times \frac{Q_p}{t} \times \frac{1}{DS},$$

wherein $L$ is the length of the passageway, $Q_p/t$ is the mass of agent dispensed from the device per unit time, $D$ is the diffusion coefficient of agent in the dispensed solution, $S$ is the solubility of agent in the fluid and $F$ has a value of from 2 to 1000, said passageway having a minimum area, $A_s$, defined by $$\left[ \frac{Lv}{t} \times 8 \times \frac{\pi \eta}{\Delta P} \right]^{1/2}$$

wherein $L$ is the length of the passageway, $(v/t)$ is the volume of agent solution dispensed per unit time, $\pi$ is 3.14, $\eta$ is the viscosity of the solution being dispensed and $\Delta P$ is the hydrostatic pressure difference between the inside and the outside of the compartment and having a value of up to about 20 atmospheres, and;
    d. wherein in operation with the device in the environment of use, external fluid from the environment is continuously imbibed through the wall into the compartment in a tendency towards osmotic equilibrium at a rate determined by the permeability of the wall and the osmotic pressure gradient across the wall, thereby continuously dissolving the agent which is dispensed from the device through the passageway at a controlled rate over a prolonged period of time.

2. The osmotic device according to claim 1 wherein the device is structured and adapted as a dosage form for administration of active agent to the gastrointestinal tract.

3. The osmotic device according to claim 1 wherein the agent in the compartment is mixed with an organic or inorganic solute that exhibits an osmotic pressure gradient against the external environmental fluid.

4. The osmotic device according to claim 1 wherein the device is structured and adapted to be placed in the vagina.

5. The osmotic device according to claim 1 wherein the device is structured and adapted in the form of a subcutaneous implant.

6. The osmotic device according to claim 1 wherein the device is an intrauterine device adapted for the release of agent to the uterus.

7. The osmotic device according to claim 1 wherein the wall material of the device is selected from the group consisting of cellulose acetate, methyl cellulose, polyvinyl alcohol and polyurethane.

8. The osmotic device according to claim 1 wherein said device has a single passageway.

9. The osmotic device according to claim 1 wherein the compartment additionally contains a dispersant for the agent.

10. The osmotic device according to claim 1 wherein the compartment additionally contains a gelling agent.

11. The osmotic device according to claim 1 wherein the compartment contains the agent and the solute admixed in a binder that releases the agent and solute on contact with external fluid that enters the compartment.

12. A device for the continuous dispensing of an active agent, said device comprising;
    a. a shaped wall formed in part of a semipermeable material that is permeable to the passage of an external fluid in the environment of use and substantially impermeable to the agent, and in the remaining part of a material substantially impermeable to both the fluid and agent;
    b. a compartment defined by the wall and containing the agent that exhibits an osmotic pressure gradient across the wall against the fluid;
    c. a passageway communicating with the compartment and the exterior of the device, said passageway having a maximum cross-sectional area $A_s$, defined by $$\frac{L}{F} \times \frac{Q_p}{t} \times \frac{1}{DS}$$

wherein L is the length of the passageway, $(Q_p/t)$ is the mass of agent dispensed from the device per unit time, $D$ is the diffusion coefficient of agent in the dispensed solution, $S$ is the solubility of agent in the fluid, and $F$ has a value of about 2 to 1000, said passageway having a minimum area $A_s$, as defined by $$\left[ \frac{Lv}{t} \times 8 \times \frac{\pi \eta}{\Delta P} \right]^{1/2}$$

wherein L is the length of the passageway, $(v/t)$ is the volume of solution dispensed per unit time, $\pi$ is 3.14, $\eta$ is the viscosity of the solution dispersed, and $\Delta P$ is the hydrostatic pressure difference between the inside and the outside of the compartment and having a value of up to about 20 atmospheres; and, d. wherein in operation with the device in the environment of use, the external fluid from the environment is imbibed through the wall into the compartment in a tendency towards osmotic equilibrium at a rate determined by the permeability of the wall and the osmotic pressure gradient across the wall, whereby agent is dispensed from the device through the passageway at a controlled rate over a prolonged period of time.

13. A device for the continuous dispensing of an agent according to claim 12 wherein the agent is contained in the compartment along with an organic or inorganic solute that exhibits an osmotic pressure gradient across the wall against the external fluid.

14. A device for the continuous dispensing of an agent according to claim 12 wherein the wall material of the device is comprised of a material that erodes after the device releases its agent in the environment of use.

15. A device for the continuous dispensing of an active agent according to claim 14 wherein the material is a member selected from the group consisting of polyglycolic and polylactic acid.

16. A device for the continuous dispensing of an agent according to claim 12 wherein the device is comprised of a material that is substantially insoluble in water.

17. A device for the continuous dispensing of an agent according to claim 12 wherein the device is adapted and structured for the release of the agent in the mouth.

18. A device for the continuous dispensing of an agent according to claim 12 wherein the agent dispensed from the device to the environment of use is a member selected from the group consisting of pesticide, insecticide, germicide, fungicide and algicide.

19. A device for the continuous dispensing of an agent according to claim 12 wherein the agent dispensed from the device to the environment of use is a plant nutrient.

20. An ocular device for the continuous and prolonged administration of an ophthalmic drug, said device comprising:
   a. an ophthalmic drug that exhibits an osmotic pressure gradient against eye fluid;
   b. a wall formed of a semipermeable material that is insoluble in eye fluid and which material is permeable to the passage of eye fluid and essentially impermeable to the passage of drug, the wall forming a compartment containing the drug;
   c. a passageway in the wall and extended therethrough so as to communicate with the compartment and the exterior of the device, said passageway having a maximum cross-sectional area, $A_s$ defined by $$\frac{L}{F} \times \frac{Q_\nu}{t} \times \frac{1}{DS},$$

wherein $L$ is the length of the passageway, ($Q_\nu/t$) is the mass of agent released per unit time, $D$ is the diffusion coefficient of drug in the dispensed solution, $S$ is the solubility of drug in the fluid, and $F$ has a value of from 2 to 1000, said orifice having a minimum area, $A_s$ defined by $$\left[\frac{L\nu}{t} \times 8 \times \frac{\pi\eta}{\Delta P}\right]^{1/2}$$

wherein $L$ is the length of the passageway, $\nu/t$ is the volume of drug dispensed per unit time, $\pi$ is 3.14, $\eta$ is the viscosity of the drug solution dispensed, and $\Delta P$ is the hydrostatic pressure difference between the inside and the outside of the compartment and having a value of up to 20 atmospheres; and, d. wherein the environment of use, eye fluid is imbibed through the wall into the compartment in a tendency towards osmotic equilibrium at a rate proportional to the permeability of the wall and the osmotic pressure gradient across the wall, thereby dissolving agent which is dispensed from the device through the passageway at a controlled rate over a prolonged period of time.

21. An ocular device for the continuous and prolonged administration of a drug according to claim 20 wherein the drug is a member selected from the group consisting of pilocarpine and its pharmaceutically acceptable salts.

22. An osmotic device for the continuous dispensing of an active agent to an environment of use, said device comprising:
   a. a shaped wall formed of a semipermeable material that maintains its integrity during the dispensing period and which is characterized as permeable to the passage of an external fluid in the environment of use and substantially impermeable to the passage of the active agent, the wall surrounding and forming;
   b. a compartment containing a mixture of the active agent, characterized by having limited solubility in the external fluid, and an osmotically effective solute composition which exhibits an osmotic pressure gradient across the wall against the external fluid;
   c. a passageway in the wall for dispensing agent from the device, said passageway having a maximum cross-sectional area, $A_s$, defined as $$\frac{L}{F} \times \frac{Q_\nu}{t} \times \frac{1}{DS},$$

wherein $L$ is the length of the passageway, ($Q_\nu/t$) is the mass of agent dispensed from the device per unit time, $D$ is the diffusion coefficient of agent in the dispensed solution, $S$ is the solubility of agent in the fluid and $F$ has a value of from 2 to 1000, said passageway having a minimum area, $A_s$, defined by $$\left[\frac{L\nu}{t} \times 8 \times \frac{\pi\eta}{\Delta P}\right]^{1/2}$$

wherein $L$ is the length of the passageway, ($\nu/t$) is the volume of agent solution dispensed per time, $\pi$ is 3.14, $\eta$ is the viscosity of the solution being dispensed and $\Delta P$ is the hydrostatic pressure difference between the inside and the outside of the compartment and having a value up to about 20 atmospheres, and;

d. wherein in operation with the device in the environment of use, external fluid from the environment is imbibed through the wall into the compartment in tendency towards osmotic equilibrium at a rate controlled by the permeability of the wall and the osmotic gradient across the wall thereby continuously dissolving the solute, which as a mixture with the agent, is dispensed through the passageway at a controlled rate for a prolonged period of time.

23. An osmotic device for the continuous dispensing of an agent according to claim 22 wherein the agent is a drug.

24. An osmotic device for the continuous dispensing of an agent according to claim 22 wherein the agent is a member selected from the group consisting of biocide, insecticide and fungicide.

25. An osmotic device for the continuous dispensing of an agent according to claim 22 wherein the agent is a plant fertilizer.

26. The osmotic device according to claim 22 wherein the compartment additionally contains a dispersant for the agent.

27. The osmotic device according to claim 22 wherein the compartment additionally contains a gelling agent.

28. The osmotic device according to claim 22 wherein the compartment contains the agent and the solute admixed in a binder that releases the agent and solute on contact with external fluid that enters the compartment.

29. An oral device for the controlled and continuous dispensing of a unit dosage amount of drug, to the gastrointestinal tract, said device comprising:
   a. a shaped wall formed of an inert, nontoxic material that maintains its integrity during the dispensing period of drug, said wall comprised of a semipermeable material that is permeable to the passage of an external gastrointestinal fluid and substantially impermeable to drug, with the wall surrounding and forming;
   b. a compartment containing the unit dosage amount of drug, said drug being soluble in the external fluid, with drug exhibiting an osmotic pressure gradient across the wall against the fluid when the device is in the environment of use;
   c. a passageway communicating with the compartment and the exterior of the device for dispensing drug from the device, said passageway adapted to pass a therapeutically effective amount of drug and having a maximum cross-sectional area, $A_s$ defined by $$\frac{L}{F} \times \frac{Q_p}{t} \times \frac{1}{DS}$$

wherein $L$ is the length of the passageway, $(Q_p/t)$ is the mass delivery rate of drug $D$ is the diffusion coefficient of drug in the compartment, $S$ is the solubility of drug in the fluid, and $F$ is from 2 to 1000, said passageway having a minimum area $A_s$ defined by $$\left[\frac{Lv}{t} \times 8 \times \frac{\pi\eta}{\Delta P}\right]^{1/2}$$

wherein $L$ is the length of the passageway, $v/t$ is the drug solution volume delivery rate, $\pi$ is 3.14, $\eta$ is the viscosity of the drug solution dispensed from the device, and $\Delta P$ is the hydrostatic pressure difference between the inside and outside of the compartment and having a value of up to 20 atmospheres; and,
   d. wherein in operation with the device in the environment of use, external fluid is imbibed through the wall into the compartment in a tendency towards osmotic equilibrium at a rate controlled by the permeability of the wall and the osmotic gradient across the wall producing a drug solution that is dispensed from the device at a controlled and continuous rate over a prolonged period of time.

30. The oral device according to claim 29 wherein the drug in the compartment is mixed with an organic or inorganic solute that exhibits an osmotic pressure gradient against the gastrointestinal fluids.

31. The oral device according to claim 29 wherein the compartment additionally contains a member selected from the group consisting of a colloid, a dispersant, a binder, a gelling agent, and a surfactant for the drug.

32. The oral device according to claim 29 wherein the drug is a member selected from the group consisting of acetazolamide, potassium chloride, quinine dihydrochloride, sodium salicylate, diphenyl hydantoin, l-dopa, codeine, scopolamine, benzodiazepine, chlordiazepoxide, ephedrine, procainamide, nitroglycerin, 5-fluorouracil, insulin, tolbutamide, chlorpropamide, and chlorpromazine.

33. The oral device according to claim 29 wherein the drug in the compartment is present in a form selected from the group consisting of a dispersion, tablet, solution, paste, cream, granule, emulsion, suspension and powder.

34. The oral device according to claim 29 wherein the wall is a member selected from the group consisting of cellulose acetate, methyl cellulose, polyvinyl alcohol and polyurethane.

35. A method for continuously administering an active agent at a controlled rate to the gastrointestinal tract of a warm blooded animal comprising:
   A. Admitting into the gastrointestinal tract a device comprising:
      1. a shaped wall formed of a semipermeable material that is permeable to the passage of gastrointestinal fluid and substantially impermeable to active agent, said wall surrounding and forming;
      2. a compartment containing the active agent that is soluble in fluid that enters the compartment and which agent exhibits an osmotic pressure gradient across the wall against the gastrointestinal fluid;
      3. a passageway in the wall for releasing agent from the device, said passageway having a maximum cross-sectional area, $A_s$ of $$\frac{L}{F} \times \frac{Q_p}{t} \times \frac{1}{DS}$$

wherein $L$ is the length of the passageway, $(Q_p/t)$ is the mass of agent released per unit time, $D$ is the diffusion coefficient of agent in the released solution, $S$ is the solubility of agent in the fluid and $F$ has a value of approximately 2 to 1000, said passageway having a minimum area, $A_s$ defined by $$\left[\frac{Lv}{t} \times 8 \times \frac{\pi\eta}{\Delta P}\right]^{1/2}$$

wherein $L$ is the length of the passageway, $v/t$ is the volume of agent released per unit time, $\pi$ is 3.14, $\eta$ is the viscosity of the solution being released, and $\Delta P$ is the hydrostatic pressure difference between the inside and the outside of the compartment and having a value of up to about 20 atmospheres;

B. Dissolving said agent in the compartment in the gastrointestinal fluid being imbibed through the wall into the compartment at a rate determined by the permeability of the wall and the osmotic pressure gradient across the wall to continuously dissolve the agent;

C. Releasing the agent from the device at a therapeutically effective controlled and continuous rate through the passageway to the gastrointestinal tract over a prolonged period of time.

36. The oral device according to claim 29 wherein the drug is potassium chloride.

* * * * *

UNITED STATES PATENT OFFICE
CERTIFICATE OF CORRECTION

PATENT NO. : 3,916,899

DATED : November 4, 1975

INVENTOR(S) : Theeuwes, Felix, et al

It is certified that error appears in the above-identified patent and that said Letters Patent are hereby corrected as shown below:

On the title page, left hand column, under the heading "Notice," the date, "November 5, 1974," should read, --November 5, 1991--.

Signed and Sealed this

Twenty-first Day of December 1976

[SEAL]

Attest:

RUTH C. MASON
*Attesting Officer*

C. MARSHALL DANN
*Commissioner of Patents and Trademarks*